(12) United States Patent
Calley

(10) Patent No.: US 8,840,131 B1
(45) Date of Patent: Sep. 23, 2014

(54) THREE-WHEELED VEHICLE

(71) Applicant: David Calley, Flagstaff, AZ (US)

(72) Inventor: David Calley, Flagstaff, AZ (US)

(73) Assignee: Planet Rider LLC, Flagstaff, AZ (US)

( * ) Notice: Subject to any disclaimer, the term of this patent is extended or adjusted under 35 U.S.C. 154(b) by 0 days.

(21) Appl. No.: 13/841,948

(22) Filed: Mar. 15, 2013

(51) Int. Cl.
B62D 61/06 (2006.01)
B62K 5/027 (2013.01)
B62K 5/05 (2013.01)

(52) U.S. Cl.
CPC .............. *B62K 5/05* (2013.01); *B62D 61/065* (2013.01); *B62K 5/027* (2013.01)
USPC .......................................... 280/638; 180/210

(58) Field of Classification Search
CPC .......... B62K 5/05; B62K 5/027; B62K 15/00; B62K 25/02; B62D 61/065
USPC .............. 180/210, 211; 280/43, 43.11, 43.22, 280/638, 47.21
See application file for complete search history.

(56) References Cited

U.S. PATENT DOCUMENTS

| 2,177,793 | A | * | 10/1939 | Taylor | 280/215 |
| 3,576,228 | A | * | 4/1971 | Kasselmann | 180/421 |
| 4,717,164 | A | * | 1/1988 | Levavi | 280/259 |
| 4,746,206 | A | * | 5/1988 | Kusztos et al. | 359/555 |
| 6,015,022 | A | * | 1/2000 | Thuliez | 180/210 |
| 7,731,210 | B2 | * | 6/2010 | Pedersen | 280/124.103 |
| 7,870,922 | B2 | * | 1/2011 | McVicar et al. | 180/209 |
| 2013/0081892 | A1 | * | 4/2013 | Kronfeld et al. | 180/210 |

* cited by examiner

Primary Examiner — Joseph M Rocca
Assistant Examiner — Timothy Wilhelm
(74) Attorney, Agent, or Firm — Invention To Patent Services; Alex R. Hobson

(57) ABSTRACT

A three-wheeled vehicle having an arrangement of wheels with two forward wheels and one back wheel and a profile adjustment feature is described. The back wheel may be configured as the steering wheel, and in some cases is the only steering wheel. The two forward wheels are configured essentially parallel with each other and the back wheel is configured essentially centered between and back from the two forward wheels. This arrangement of the wheels provides for a stability that does not require a person to maintain balance to keep the vehicle in an upright position. The profile adjustment feature may automatically adjust the height of the vehicle as a function of vehicle speed. As the vehicle speeds up, the height may be reduce to provide a more stable vehicle that is turned more by tilting the vehicle than by turning the back wheel.

20 Claims, 30 Drawing Sheets

| Ratio geometry setting 75 | | | | |
|---|---|---|---|---|
| Steering angle | Actuation distance | Movement 75 26 | Ratio | |
| 0 | 0 | 0 | | |
| 5 | 0.63 | 0.63 | 100% | 1 |
| 10 | 1.44 | 0.81 | 129% | 2 |
| 15 | 2.4 | 0.96 | 152% | 3 |
| 20 | 3.52 | 1.12 | 178% | 4 |
| 25 | 4.76 | 1.24 | 197% | 5 |
| 30 | 6.13 | 1.37 | 217% | 6 |
| 35 | 7.61 | 1.48 | 235% | 7 |
| 40 | 9.19 | 1.58 | 251% | 8 |
| 45 | 10.86 | 1.67 | 265% | 9 |
| 50 | 12.6 | 1.74 | 276% | 10 |
| 55 | 14.41 | 1.81 | 287% | 11 |
| 60 | 16.27 | 1.86 | 295% | 12 |
| 65 | 18.17 | 1.9 | 302% | 13 |
| 70 | 20.1 | 1.93 | 306% | 14 |
| 75 | 22.06 | 1.96 | 311% | 15 |
| 80 | 24.03 | 1.97 | 313% | 16 |
| 85 | 26.01 | 1.98 | 314% | 17 |
| 90 | 27.99 | 1.98 | 314% | 18 |
| 95 | 29.96 | 1.97 | 313% | 18 |
| 100 | 31.92 | 1.96 | 311% | 17 |
| 105 | 33.86 | 1.94 | 308% | 16 |
| 110 | 35.77 | 1.91 | 303% | 15 |
| 115 | 37.64 | 1.87 | 297% | 14 |
| 120 | 39.48 | 1.84 | 292% | 13 |
| 125 | 41.27 | 1.79 | 284% | 12 |
| 130 | 43 | 1.73 | 275% | 11 |
| 135 | 44.68 | 1.68 | 267% | 10 |
| 140 | 46.29 | 1.61 | 256% | 9 |
| 145 | 47.82 | 1.53 | 243% | 8 |
| 150 | 49.26 | 1.44 | 229% | 7 |
| 155 | 50.61 | 1.35 | 214% | 6 |
| 160 | 51.85 | 1.24 | 197% | 5 |
| 165 | 52.97 | 1.12 | 178% | 4 |
| 170 | 53.95 | 0.98 | 156% | 3 |
| 175 | 54.77 | 0.82 | 130% | 2 |
| 180 | 55.4 | 0.63 | 100% | 1 |
| 185 | 55.4 | 0 | | |

FIG. 32

Center differential

Tight maneuvering

THREE-WHEELED VEHICLE

BACKGROUND OF THE INVENTION

1. Field of the Invention

The present invention relates to a three-wheeled vehicle and in particular a power assisted three-wheeled vehicle.

2. Background

Transportation, and particularly routine local daily transportation, such as to and from work, is an expensive necessity for many people. The costs to poses and operate an automobile are extremely high and have risen dramatically in recent years. In addition, automobiles create congestion on the roadways and locating a parking location can be trying. Furthermore, automobiles provide no means for physical exercise and pollute the environment and burn fossil fuels, a limited resource.

For many people, the commute to work is no more than about 10 miles making it practical for them to use human powered forms of transportation, such as a bicycle. However, some people are uncomfortable on bicycles, as a two wheeled vehicle requires the rider to maintain their balance. Many people fear they will lose their balance riding a bicycle and wreck and are uncomfortable riding along with automobiles as a bicycle provide no protection for the rider. In addition, bicycles do not provide a person with protection from the weather, including wind, rain, snow, and the cold, leaving them looking disheveled when they arrive at their location. Furthermore, bicycling can be very strenuous, especially during uphill climbs, and can leave a person sweating and feeling drained when they arrive at their destination.

Electric bicycles (eBikes) have made gains for use as personal transportation due to low cost, effectiveness in dense urban areas, use for the "last mile," and personal and societal health benefits. However, as with standard bicycles, many people are uncomfortable operating them on busy roads, fear they may wreck, and there is no protection from the elements or from other vehicles. Furthermore, bicycles provide limited to no cargo carrying capacity. As yet, attempts to provide both the advantages of an eBike and a car in one vehicle have resulted in an amalgamation that effectively provides neither.

There exists a need for a vehicle that is stable, whereby a person can operate it without needing to keep their balance, provides protection from other vehicles and the elements, provides some cargo capacity, is power assisted providing an opportunity to exercise and low cost to own and operate.

SUMMARY OF THE INVENTION

The invention is directed to a three-wheeled vehicle that comprises an arrangement of wheels with two forward wheels and one back wheel. The two forward wheels are configured essentially parallel with each other and the back wheel is configured essentially centered between and back from the two forward wheels. This arrangement of the wheels provides for a stable vehicle that does not require a person to maintain balance to keep the vehicle in an upright position; as is required on two wheeled vehicles such as a bicycle. In addition, this arrangement of wheels provides for a zero turn radius, whereby the vehicle can turn about a single point between the two forward wheels. The back wheel can be turned to ninety degrees from the two front wheels and the two forward wheels can be rotated in opposing directions providing for a zero turn radius about a point centered between the two forward wheels.

The three-wheeled vehicle as described herein further comprises a profile adjustment device coupled to the back wheel, whereby the height of the vehicle can be adjusted, such as by actuating the back wheel with a linear actuator or rotational arm, or any combination thereof. In one embodiment, the height of the three-wheeled vehicle is automatically adjusted when the three-wheeled vehicle exceeds a threshold speed, or is as a relative function of speed. At low speeds the height of the vehicle, or the height of an operators head sitting in the vehicle may be at a first height, and when the three-wheeled vehicle accelerates to a higher speed, the height of the vehicle may be reduce. The reduction in the height of the vehicle may reduce the aerodynamic drag, increase efficiency and make the three-wheeled vehicle more stable by lowering the center of gravity, and thereby reducing the moment about the tilt axis. A profile adjustment device is any device or combination of devices that adjusts the height of the vehicle and may include, but is not limited to, a linear actuator, gear reduction on pivot, rack and pinion, a pivot, a plurality of pivots and the like. A profile adjustment device may comprise one or more gas struts and/or springs to facilitate the movement and alignment of the profile adjustment. A profile adjustment device is configured to reduce the height of the vehicle when a threshold speed in exceeded, or to or to continuously adjust the height of the vehicle as the speed varies to maintain desired characteristics.

The three-wheeled vehicle as described herein may further comprise a protective shell that is at least over a front portion of the vehicle. A protective, or any portion of a protective shell may be configured to be detachably attachable to the three-wheeled vehicle. A protective shell may comprise one or more windows and/or vents that may be configured to open to allow airflow into the three-wheeled vehicle. In an embodiment, a protective shell substantially envelops the three-wheeled vehicle as shown as described herein. In some embodiments, one or more doors may be configured in the protective shell. A door may be consider a portion of a protective shell of a three-wheeled vehicle as described herein. In addition, the wheels of the vehicle and particularly the front wheels may be configured to move up into a cavity within the body, such as when in a turn.

In an exemplary embodiment, the protective shell of the vehicle provides the primary structural support for the vehicle wherein components of the vehicle, such as the pedaling device, the wheels and the like are attached to the shell. A shell may comprise an inner and outer skin layer and a porous polymer layer configured therebetween. Structural supports may be configured on or inside the shell to provide additional strength to components attached thereon, or configured therethrough.

The three-wheeled vehicle may comprise an automatic tilt (lean of the vehicle) feature, whereby the amount of tilt enabled by the vehicle is increased at elevated speed. An automatic tilt feature may prevent the three-wheeled vehicle from falling over and allow for a safe amount of tilt at any speed where an operator may not operate the vehicle out of a safe zone. In an exemplary embodiment, a steering input splitter is coupled to the profile adjustment device, whereby the height of the vehicle adjusts a pivot point on the steering ratio mechanism thereby adjusting the steering contribution between back wheel turning and tilt steering control. At low speeds, the ratio is weighted toward back heel turning, and at higher speeds the ratio shift more to tilt steering control. The steering control actuator is coupled to a steering apparatus, whereby the steering input from an operator is divided between back wheel turning and tilt steering. In still another embodiment, an electric actuator changes the position of the front swing arms to cause lean such that the operator or rider does not experience substantial side acceleration. An inertial sensor may be coupled with wheel actuator(s) and control lean position automatically. A differential may be configured between the front wheels and cause the vehicle to raise as it leans to give it a tendency towards stability.

The three-wheeled vehicle as described herein may be configured with a front entrance door, whereby an operator enters through the front of the vehicle. For example, an operator may lift up or swing the front protective shell and enter the vehicle through the front of the vehicle and then close the front protective shell. In other embodiments, a door may be configured on one or more sides of the vehicle.

The three-wheeled vehicle as described herein may be configured for a single occupant or operator or may be configured for two or more occupants, such as one operator and one passenger. In an exemplary embodiment, a three-wheeled vehicle is configured for one operator and for cargo and/or a small child passenger configured behind the operator. In still another embodiment, a three-wheeled vehicle is configured for only one operator and cargo behind the operator. In other embodiments, the three-wheeled vehicle is configured for more than two passengers, more than three passengers and the like. In yet another embodiment, a passenger or storage trailer may be configured for attachment to the three-wheeled vehicle. For example, a passenger trailer may be attached to the back of a three-wheeled vehicle and may be controlled at least partially by the three-wheeled vehicle. In yet another embodiment two or more three-wheeled vehicles may be coupled together and the trailing vehicles may provide additional power to propel the linked vehicles, or may provide additional battery power to the lead vehicle. One three-wheeled vehicle may be attached to another through any suitable means including a folding tow lever and attached with a suction cup device to conventional vehicle, whereby a suction cup on at least one of the coupled vehicles in attached to a linkage between the vehicles, such as a tether, or elastic bar. However when towing another of the same vehicles, the integrated towing systems link without suction cups and are purposed to link. When a three-wheeled vehicle as described herein is coupled to an automobile it may provide additional thrust to the automobile, or simply be pulled by the automobile. A three-wheel vehicle coupled to an automobile, may provide additional power, such as battery power to an automobile, electric automobile or hybrid automobile. The 3 wheeled vehicle may recharge its battery(s) using the forward motion of the automobile and may be configured to do so only when the automobile if deceleration. The 3 wheeled vehicle may sense acceleration, deceleration and turning of the automobile using its accelerometer and respond according to what is desired. The 3 wheeled vehicle may be used to provide thrust to the automobile and reduce the automobiles energy consumption. The 3 wheeled vehicle may be used to decelerate the automobile and reduce the brake ware and conserve energy.

The three-wheeled vehicle as described herein may be completely human powered or may have one or more human power input features 50. In the completely human powered embodiment, the three-wheeled vehicle may be configured with one or more pedal devices that enable an operator and/or passenger to pedal and propel the three-wheeled vehicle. A pedal device may be coupled to one or more wheels of the three-wheeled vehicle through any suitable means, including a chain, gear linkages, belts, any combination of coupling features provided and the like. In an exemplary embodiment, a pedal device is configured in front of the operator and coupled to the two front wheels by means of the pedal power turning a generator that feeds power to motor(s) configured to turn the wheels. In still another embodiment, the three-wheeled vehicle is configured with a pedal device for the operator and a passenger. A three-wheeled vehicle as described herein may be configured for a single passenger to sit behind the operator and the pedaling devices may be coupled, whereby the operator and passenger combine there pedaling efforts. A pedaling device may be any suitable type including a rotational type, as is found on a bicycle, or reciprocating type, whereby two pedals move back and forth in a substantially linear manner including an arced path but not a rotational path. In an exemplary embodiment, a reciprocating pedaling device is configured in front of the operator and comprises pedal that flip or pivot out of the way until the operator is ready to use them so that they are not in the way when entering or exiting the vehicle or at any time that the operator does not want them open. In addition, the pedaling mechanism may be configured at least partially within the shell of the vehicle and extending pedals into the cabin.

In an exemplary embodiment, a pedaling device is coupled to a generator, whereby pedaling charges a battery that may be configured to drive one or more wheels of the three-wheeled vehicle through an electric motor. The three wheeled vehicle may use the pedal power from a human power input feature to control the forward speed of the vehicle if desired by the operator.

In an exemplary embodiment, the three-wheeled vehicle as described herein comprises one or more power assist devices, such as an electric motor. A power assist device is coupled to at least one wheel of the three-wheeled vehicle. In another embodiment an electric motor is coupled to at least one wheel. An electric motor may be coupled to a wheel through any suitable linkages or may be configured on a wheel, whereby it is located substantially about the wheel as shown and described herein. In an exemplary embodiment, two electric hub motors are configured on the two forward wheels. In yet another exemplary embodiment, an electric motor is configured on each of the three wheels of the three-wheeled vehicle. Any suitable type of electric motor may be used with the three-wheeled vehicle including, but not limited to, a brushless AC motors, brushless DC motors, DC motors, synchronous motors, synchronous motors, induction motors, brush-less type motors, brushed type motors, universal motors, induction motors, torque motors, stepper motors, servo motors, transverse flux motors and the like. In the exemplary embodiment, transverse flux motors based on MetGlas are used. A motor used in the three-wheeled vehicle may have any suitable power output including but not limited to, 1.5 kW, 7.5 kW, 15 kW and the like.

The three-wheeled vehicle as described herein may be designed to reach any suitable speed or speed range including, but not limited to, 20 mph or more, 30 mph or more, 40 mph or more, 55 mph or more, 65 mph or more and any range between and including the speeds provided, such as between and including 20 mph to 65 mph. In an exemplary embodiment, the three-wheeled vehicle is designed to reach a speed of 65 mph or more, thereby making it practical for most roads except for interstates outside of city limits. In still another embodiment, a three-wheeled vehicle as described herein is configured to reach speeds of 125 mph or more.

The three-wheeled vehicle as described herein may further comprise a regenerative braking feature and a rechargeable battery, whereby braking energy may be stored in the rechargeable battery. Brakes and/or a regenerative braking feature may be on one or more of the wheels, such as only the back wheel, the two front wheels, or all three wheels. The 3 wheeled vehicle may provide control such that wheels do not skid during breaking or acceleration. The wheels may be driven such that steering input also controls the torque, speed and or position of the wheels to aid in control, particularly steering. Control of the wheels may also be used to lean the vehicle using differential position, or torque or speed rather than other means of causing desired lean.

The three-wheeled vehicle as described herein may comprise any suitable type or combination of batteries, including but not limited to lithium based chemistry batteries. In an exemplary embodiment, a plurality of lithium based chemistry batteries are configured for quick and easy installation in the three-wheeled vehicle. In one embodiment, a battery pack is configured with a plug in feature, whereby the battery pack can be removed from the vehicle and plugged into a standard wall socket to recharge the batteries. A three-wheeled vehicle may comprise any number of removable and rechargeable battery packs including one, two, three or more and the like. The battery or batteries may have a charger and or BMS system integrated into the unit that is capable of being carried by hand with a handle so that it may be removed and recharge with a conventional power plug without other equipment or special plugs. In yet another embodiment, the three-wheeled vehicle comprises a plug in feature, whereby the three wheeled vehicle may be plugged in to charge the batteries.

The three-wheeled vehicle as described herein may comprise a smart electronic device interface, whereby any conventional smart electronic device may be plugged into a docking station and provide some electronic data, interments for the vehicle and other and functionality to the three-wheeled vehicle. In one embodiment, a smart electronic device may be connected with the three-wheeled vehicle and provide navigational information, speed, power status of the vehicle, estimated range, human power output and total output for a duration, average human power output, music and any other information that is available with smart electronic devices. In an exemplary embodiment, an operators heart rate is monitored and displayed. Sensors may be configured on the steering apparatus, such as handles, and a heart rate display may be provided on smart electronic device. In still another embodiment, a smart electronic device has a program that is specifically designed for use with the three-wheeled vehicle and in some embodiments is responsible for some of the control of the three-wheeled vehicle. For example, in one embodiment a smart electronic device connected with the vehicle may control the profile adjuster settings as a function of speed.

A smart electronic device connected with the three-wheeled vehicle may provide for communication between an operator or passenger with one three-wheeled vehicle and a person in another three-wheeled vehicle as described herein, or any other person. The smart electronic device may automatically reduce background noise picked up by a microphone before transmitting the voice from the sender to the receiver. In this way, passengers in two or more different three-wheeled vehicle, as described herein, may communicate as if they were in the same vehicle, thereby providing more of a communal experience while operating the three-wheeled vehicle. In another embodiment, a smart electronic device may also reduce or dampen the transmission of music or sound being produced by the three-wheeled vehicle sound system. For example, a person driving a three-wheeled vehicle may be listening to music and receive a call from a friend. The smart electronic device may transmit the drivers voice but dampen or reduce the music from the transmission to the caller. The smart electronic device may have access to the digital signal of the music being played in the vehicle, thereby aiding in the reduction of the music transmitted. The three-wheeled vehicle as described herein may comprise one or more rear view mirrors that may automatically adjust with the height of the vehicle to provide a substantially constant viewing direction. For example, the three-wheeled vehicle may change height as a function speed by the profile adjustment feature. An operator may not be able to see the appropriate viewing direction through the rear view mirror when the height of the vehicle changes. An automatic rear view mirror adjustment feature however, may adjust the viewing direction of the rear view mirror to maintain a substantially constant viewing direction as a function of the profile adjustment feature. An automatic rear view mirror adjustment feature may be coupled with the profile adjustment feature through the control system for example. The smart device may also be used to supplement rear view mirrors and the like by displaying information from a camera or cameras on the vehicle. The headlights may be integrated into the same unit as the mirror so that it is also automatically adjusted as the profile changes. Blinkers may be integrated into the same unit to reduce parts, working and complexity. This unit may also be removable or foldable or retractable or have some means such that it does not increase the width of the vehicle at critical times such as when passing through a doorway.

In an exemplary embodiment, a three-wheeled vehicle comprises a automatic tilt feature, whereby an inertia sensor provides input that controls the raising and lowering of the front wheels, whereby when the vehicle moves around a corner, one wheel front wheel is raised while the other wheel may be lowered to reduce the side acceleration felt by the operator of the vehicle and occupants.

The three-wheeled vehicle may be any suitable height when in its most upright position including but not limited to no greater than 6 ft, no greater than 5 ft, no greater than 4 ft, no greater than 3.5 ft and any range between and including the height values provided. Likewise the three-wheeled vehicle may have any suitable height when in the reclined high speed mode, including, but not limited to, no more than 5 ft, no more than 4 ft, no more than 3 ft, no more than 2.5 ft and range between and including the height values provided. The three-wheeled vehicle may have any suitable maximum width including, but not limited to, no more than 48", no more than 36", no more than 34", no more than 32", no more than 30", no more than 28" and any range between and including the width values provided. In an exemplary embodiment, a three-wheeled vehicle is configured to fit between a standard exterior door opening, or through a 34" wide opening. Side view mirrors may be configured to fold in and/or retract, and/or be detached to reduce the maximum width of a three-wheeled vehicle as described herein. In an exemplary embodiment, a person may commute to work in the three-wheeled vehicle described herein and take the vehicle into their work building, and in some cases an elevator and ideally into their office or place of work. The three-wheeled vehicle may be configured and sized to go where ever a wheelchair is capable of going. The three-wheeled vehicle may be plugged into a wall socket to charge the batteries for the commute back home after work, or one or more batteries may be carried into a place of work and charged.

The three-wheeled vehicle may comprise any suitable or required features of road and/or highway vehicles, including but not limited to, head lights, tail lights, break lights, turn signals on the front, back and/or sides of the vehicle, rear view mirrors or cameras, side view mirrors or cameras, windshield wipers, and any combination of features provided. In one embodiment, one or more of the mirrors changes position as a function of the tilt of the vehicle, thereby providing a more effective view when the vehicle is in a turn, or tilt.

The summary of the invention is provided as a general introduction to some of the embodiments of the invention, and is not intended to be limiting. Any suitable combination of features described in the summary may be incorporated into a three-wheeled vehicle as desired. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1:
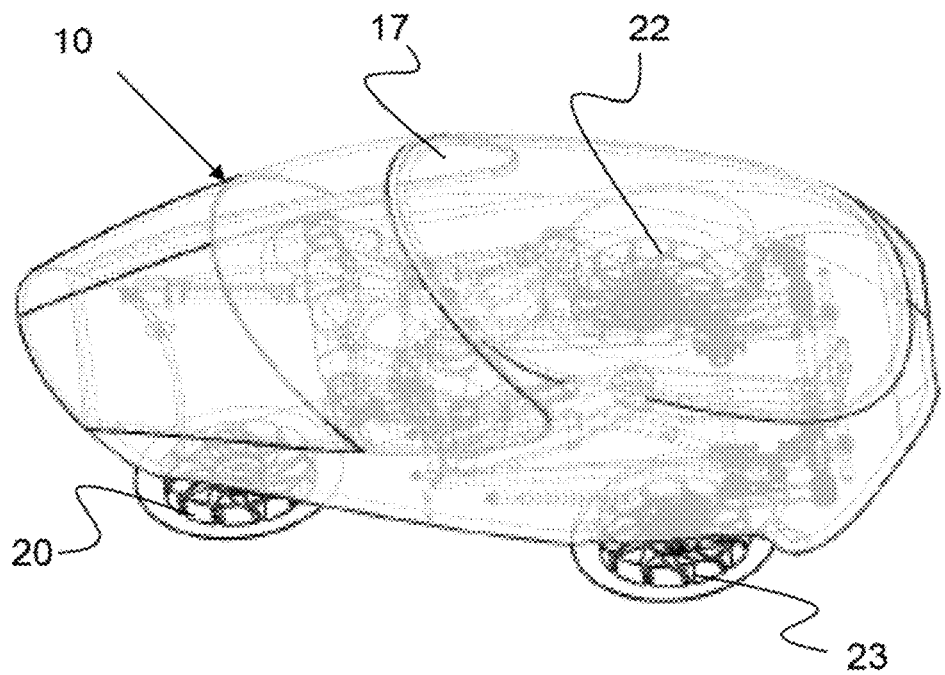

FIG. 1 shows an isometric view of an exemplary three-wheeled vehicle as described herein.

Figure 2:
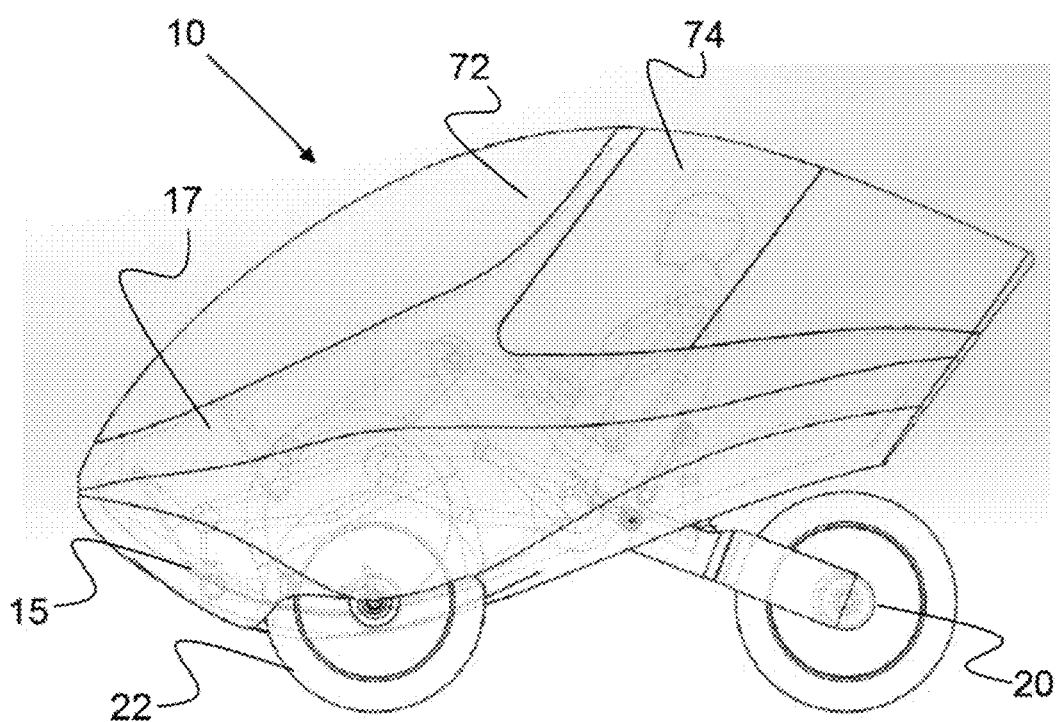

FIG. 2 shows a side view of an exemplary three-wheeled vehicle.

Figure 3:
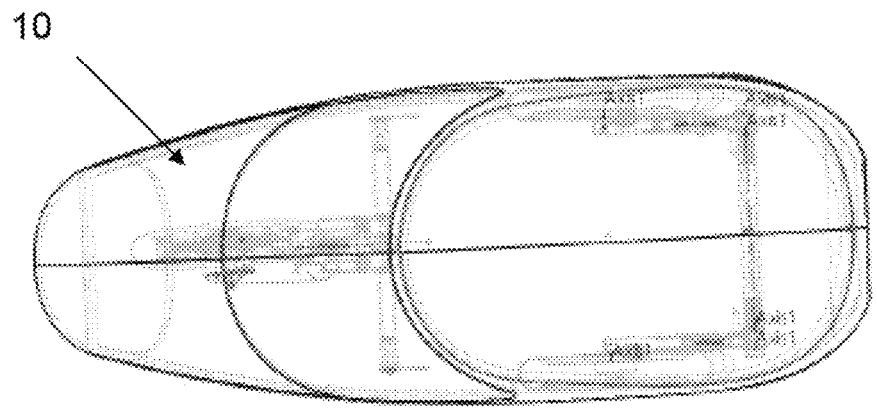

FIG. 3 shows a top down view of an exemplary three-wheeled vehicle.

Figure 4:
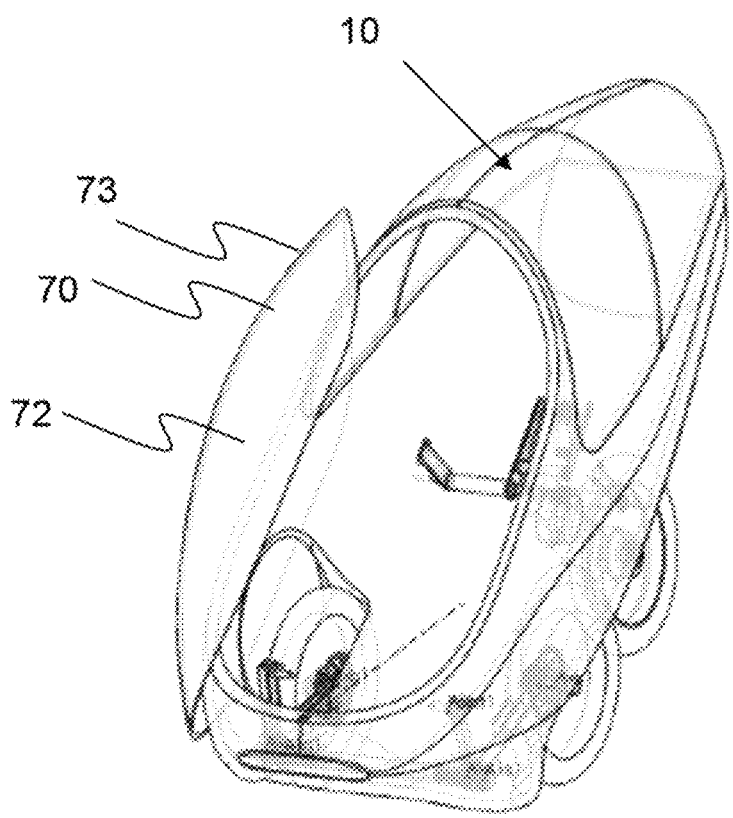

FIG. 4 shows an iso view of an exemplary three-wheeled vehicle with the entry door open.

Figure 5:
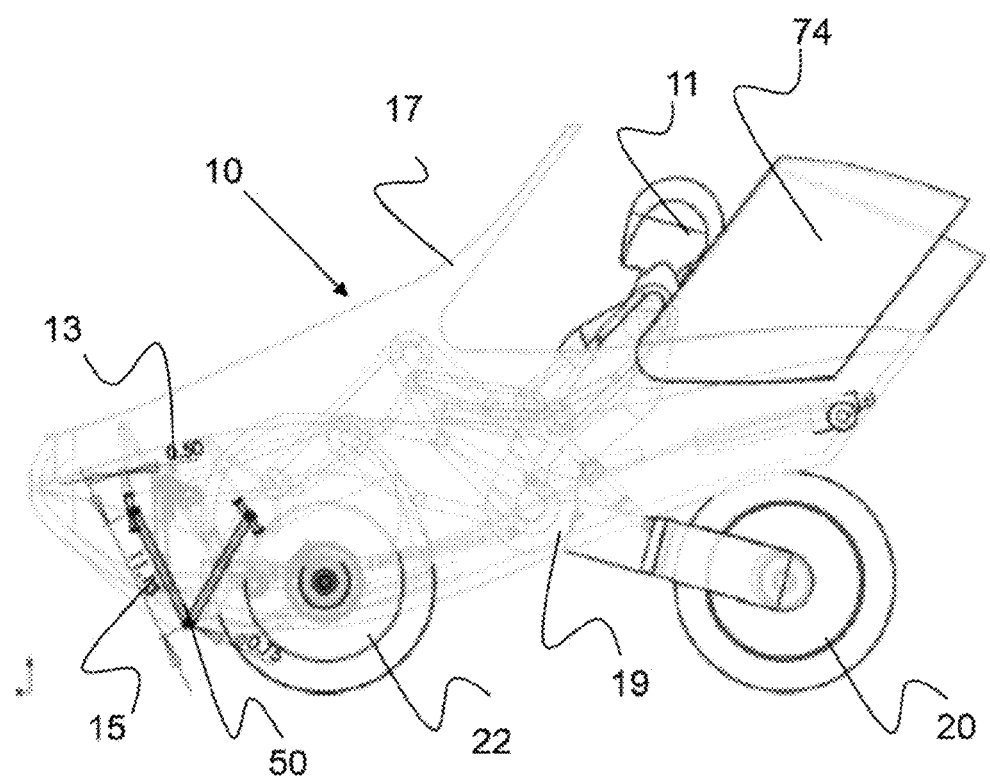

FIG. 5 shows a side view of an exemplary three-wheeled vehicle with a side window open.

Figure 6:
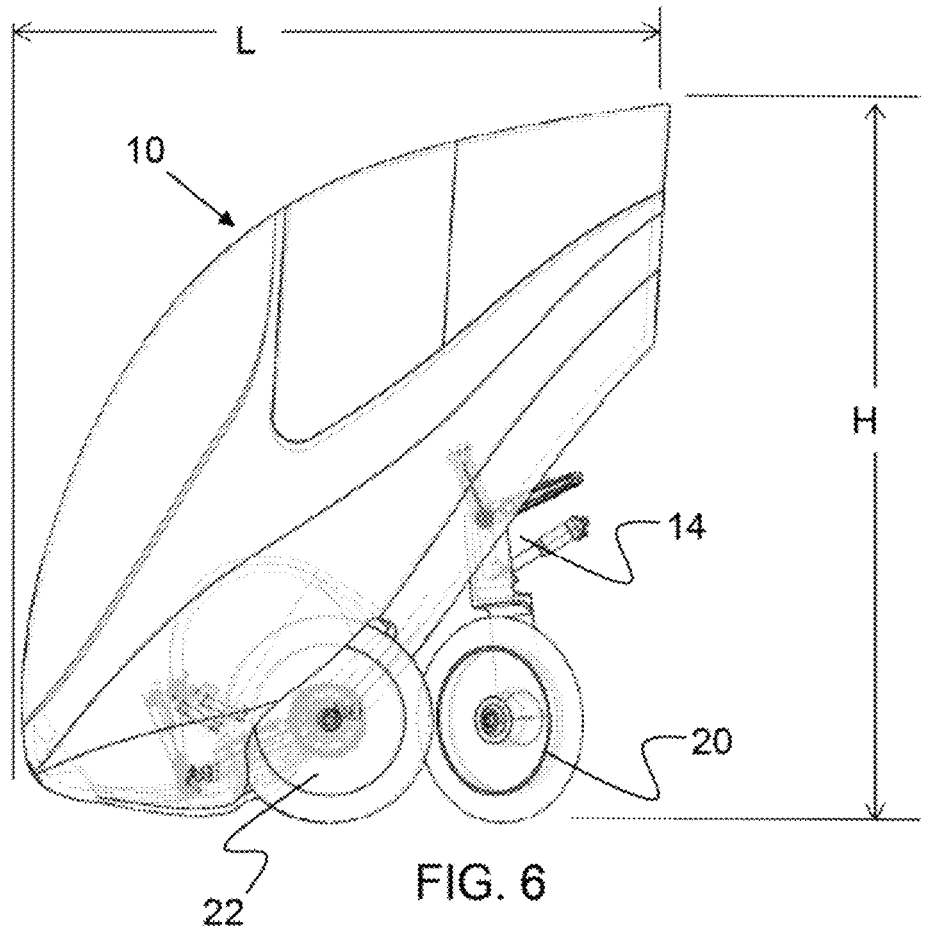

FIG. 6 shows a side view of an exemplary three-wheeled vehicle in an up profile position.

Figure 7:
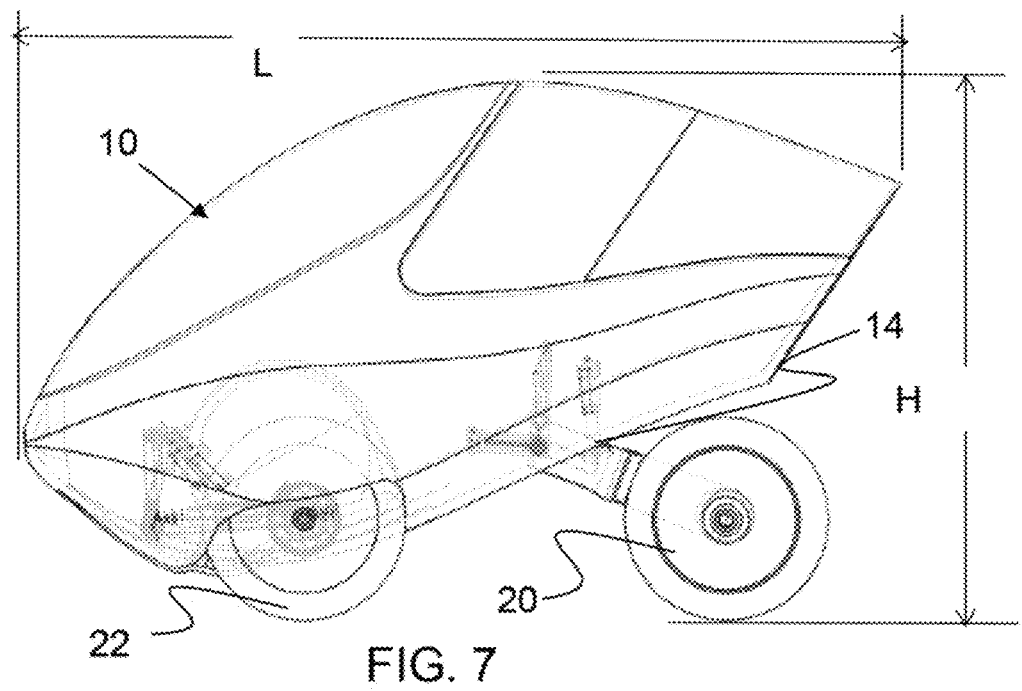

FIG. 7 shows a side view of an exemplary three-wheeled vehicle in a down or low profile position.

Figure 8:
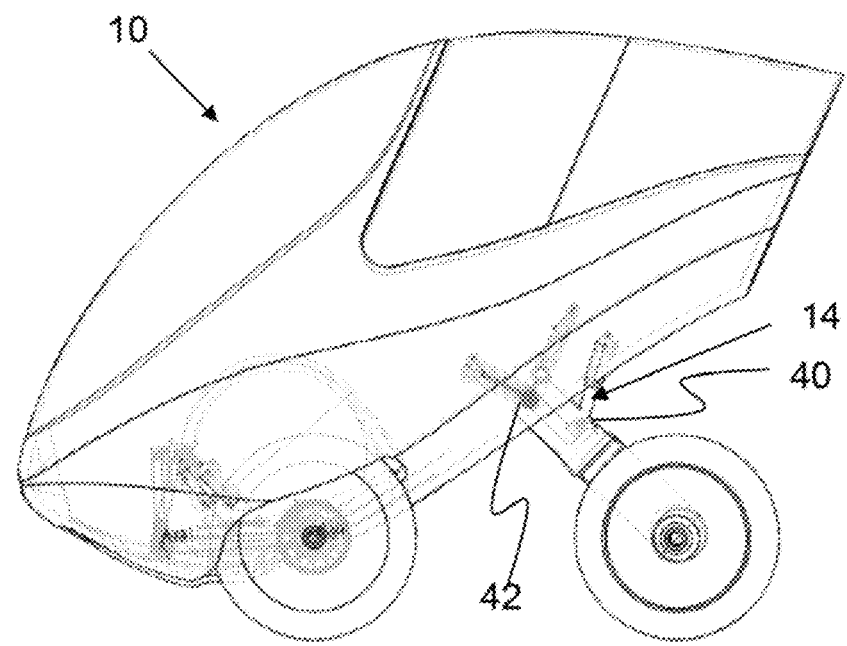

FIG. 8 shows a side view of an exemplary three-wheeled vehicle in an intermediate profile position.)

Figure 9:
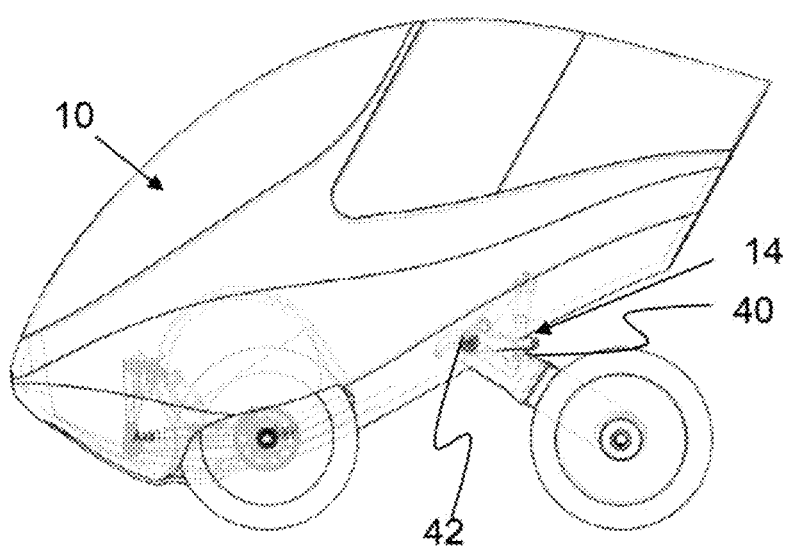

FIG. 9 shows a side view of an exemplary three-wheeled vehicle in an intermediate profile position.

Figure 10:
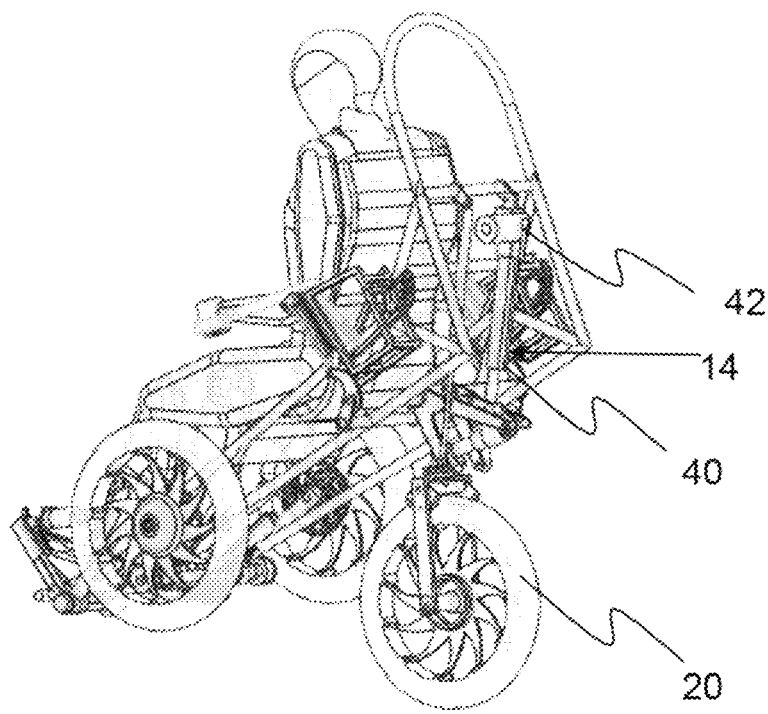

FIG. 10 shows a side view of an exemplary three-wheeled vehicle in an up profile position.

Figure 11:
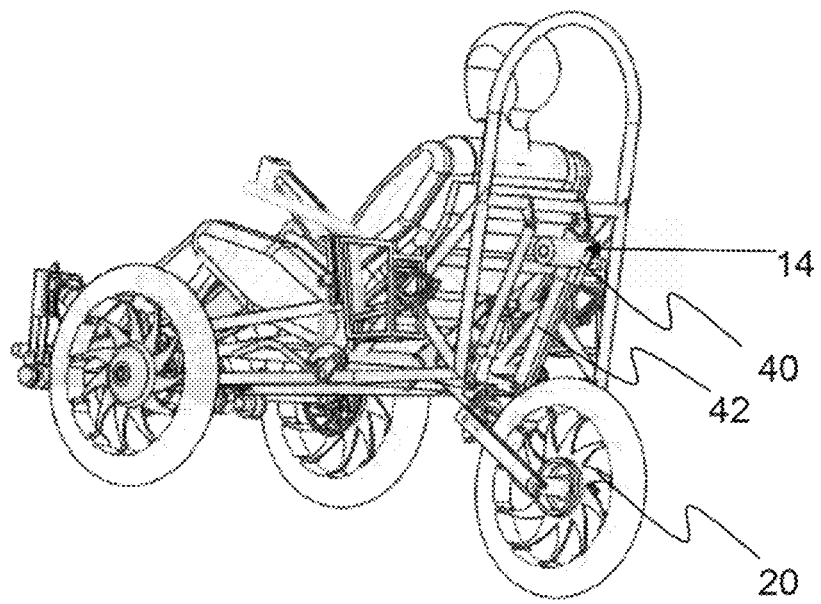

FIG. 11 shows a side view of an exemplary three-wheeled vehicle in a down or low profile position.

Figure 12:
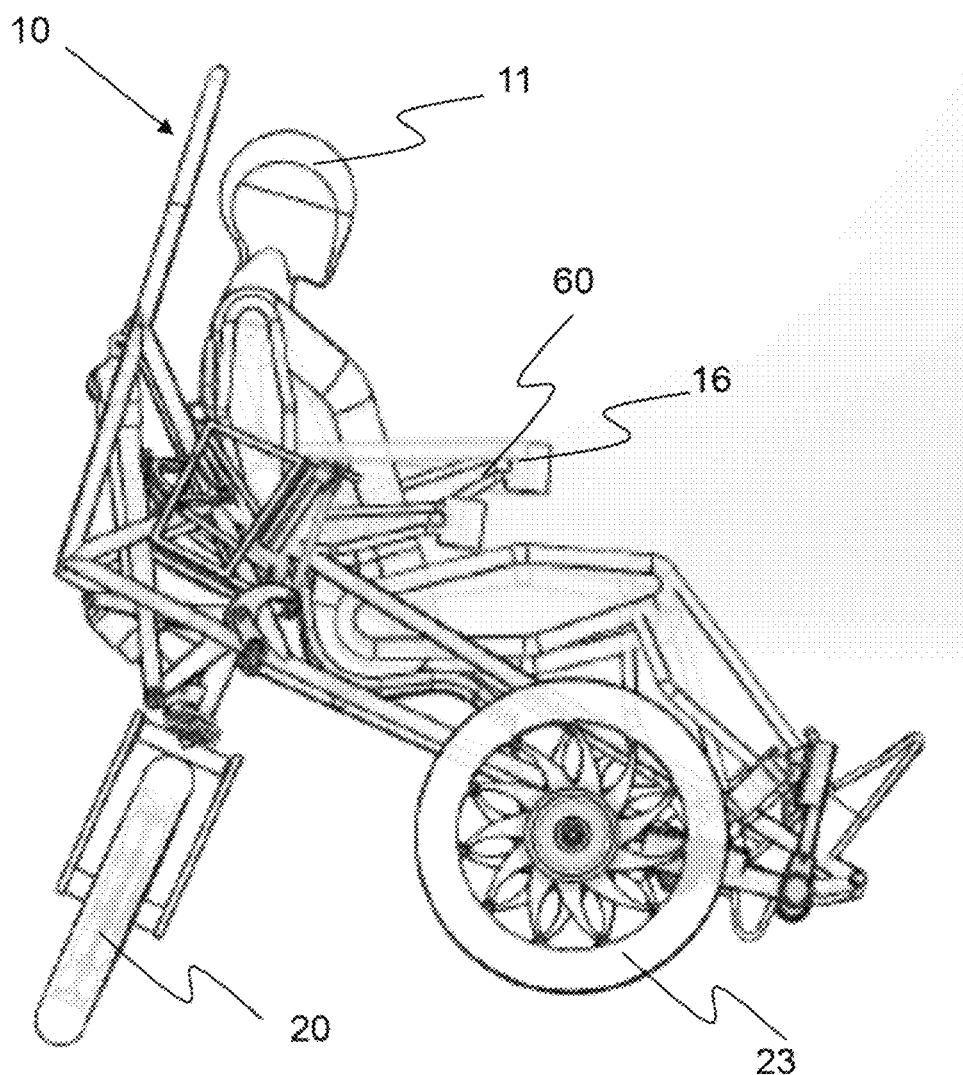

FIG. 12 show a side view of an exemplary three-wheeled vehicle frame with the rear wheel turned 90 degrees to the zero turn radius axis.

Figure 13:
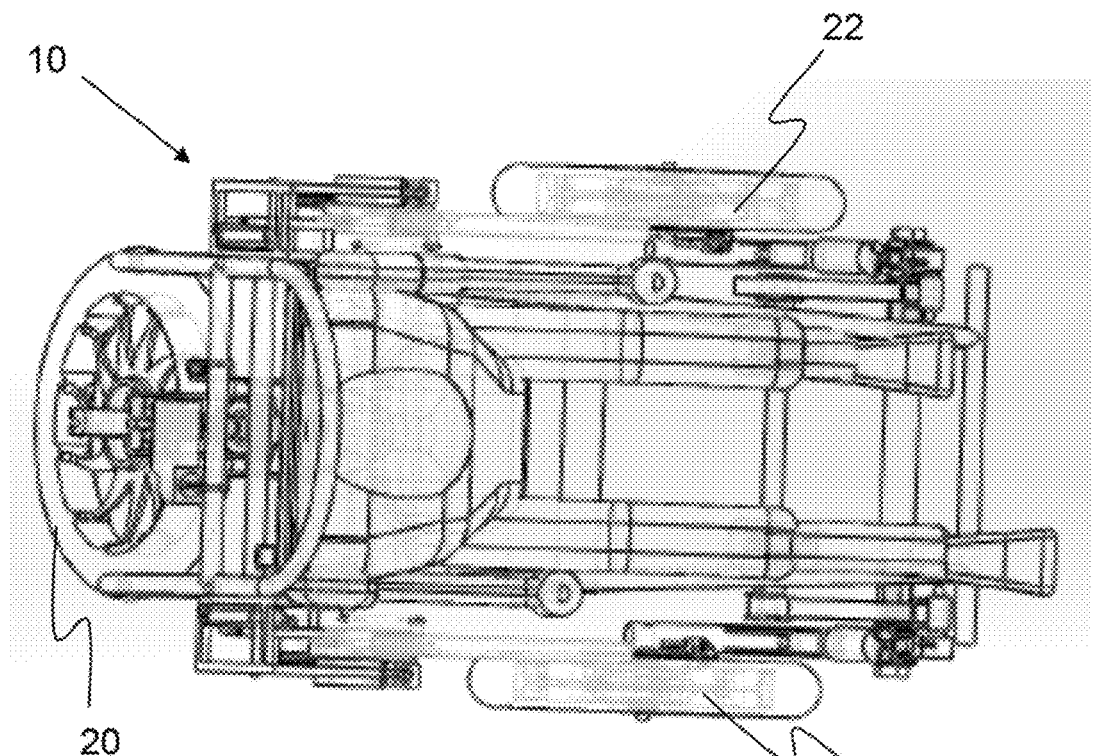

FIG. 13 show a top-down view of an exemplary three-wheeled vehicle frame with the rear wheel turned 90 degrees to the zero turn radius axis.

Figure 14:
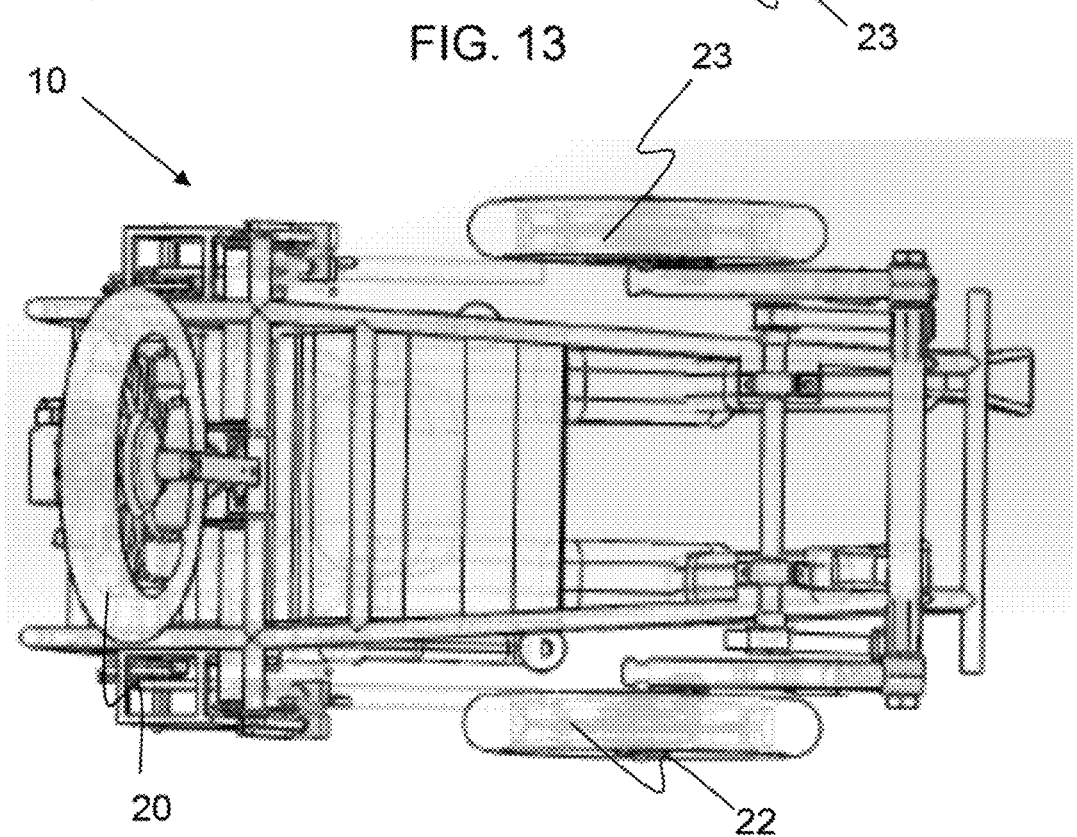

FIG. 14 show a bottom-up view of an exemplary three-wheeled vehicle frame with the rear wheel turned 90 degrees to the zero turn radius axis.

Figure 15A:
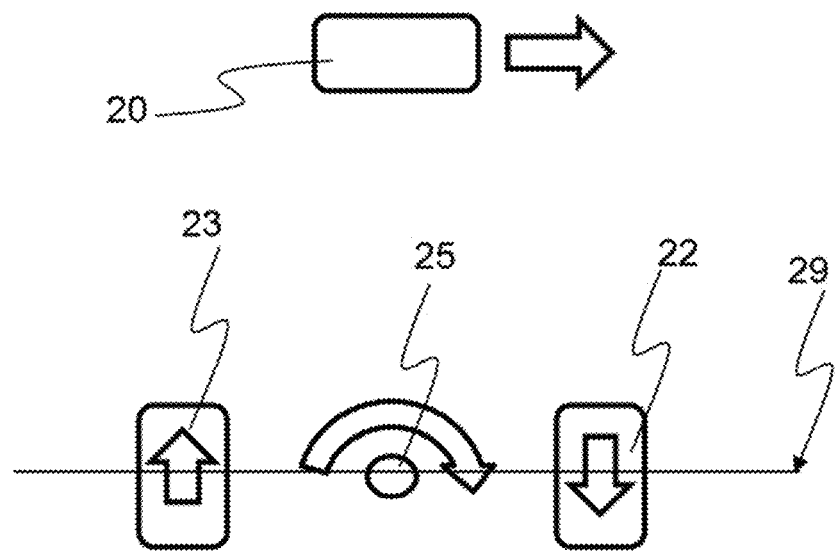
Figure 15B:
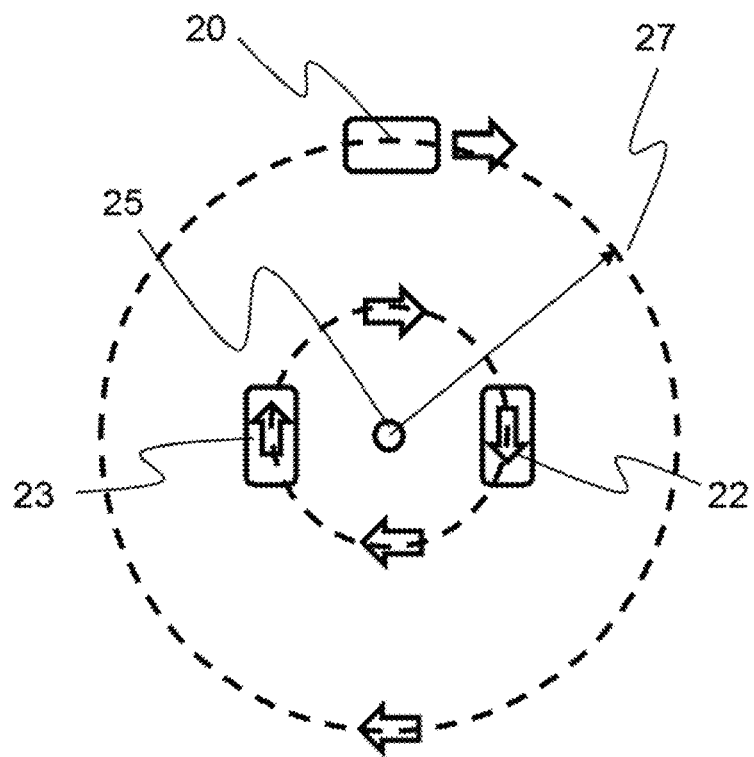

FIGS. 15A and 15B show top-down diagrams of an exemplary three-wheeled vehicle zero turn radius.

Figure 16:
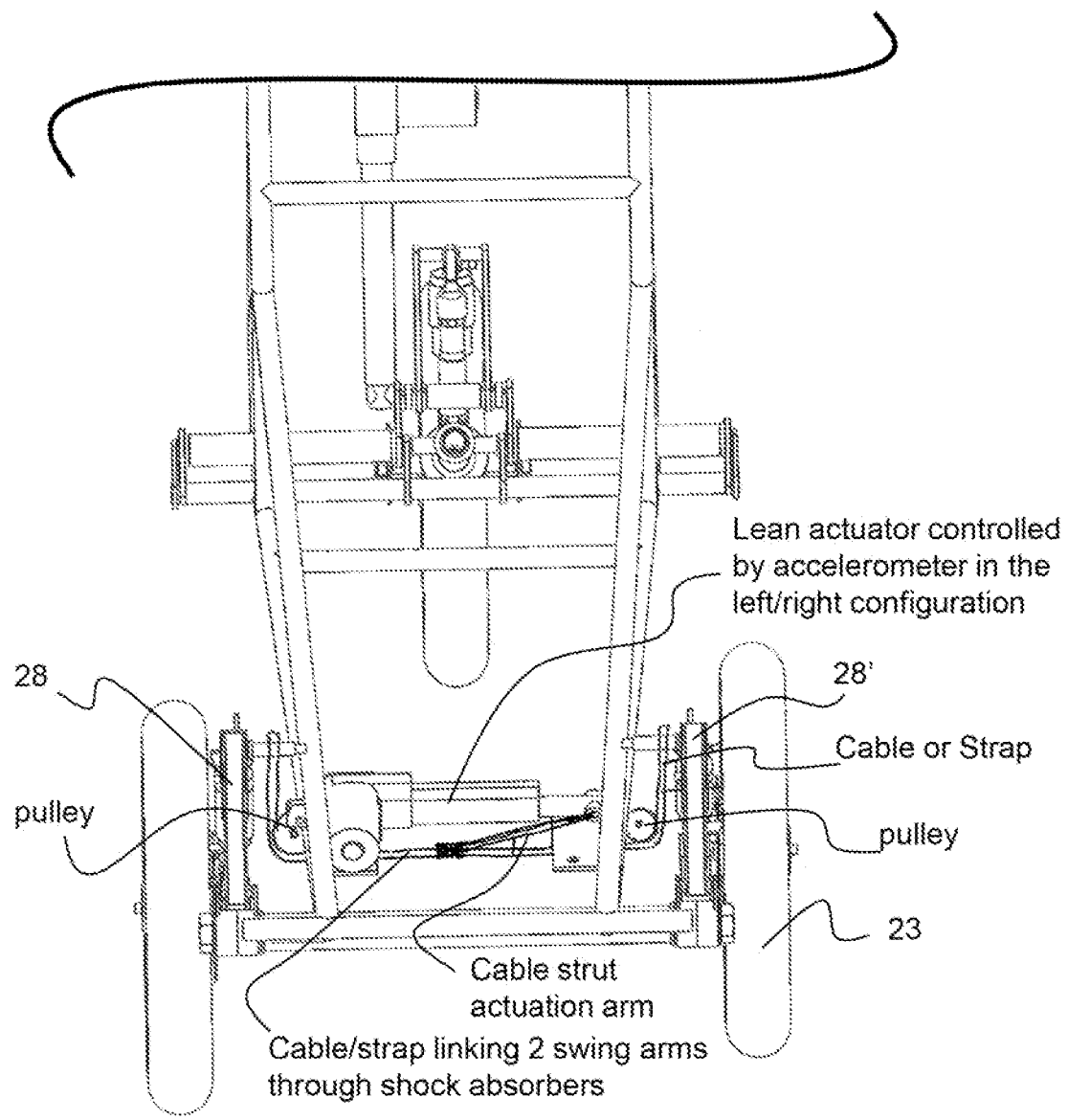

FIG. 16 shows top-down view of an exemplary three-wheeled vehicle front wheel drive and pivot configuration.

Figure 17:
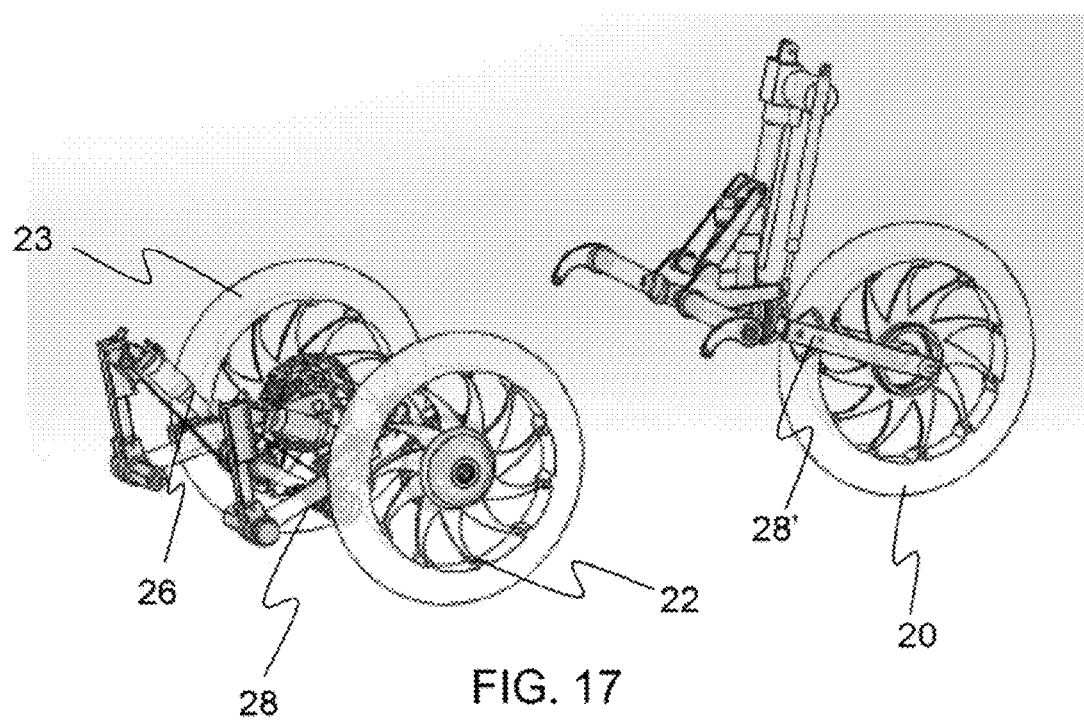

FIG. 17 shows an isometric view of exemplary wheels and exemplary swing arms.

Figure 18:
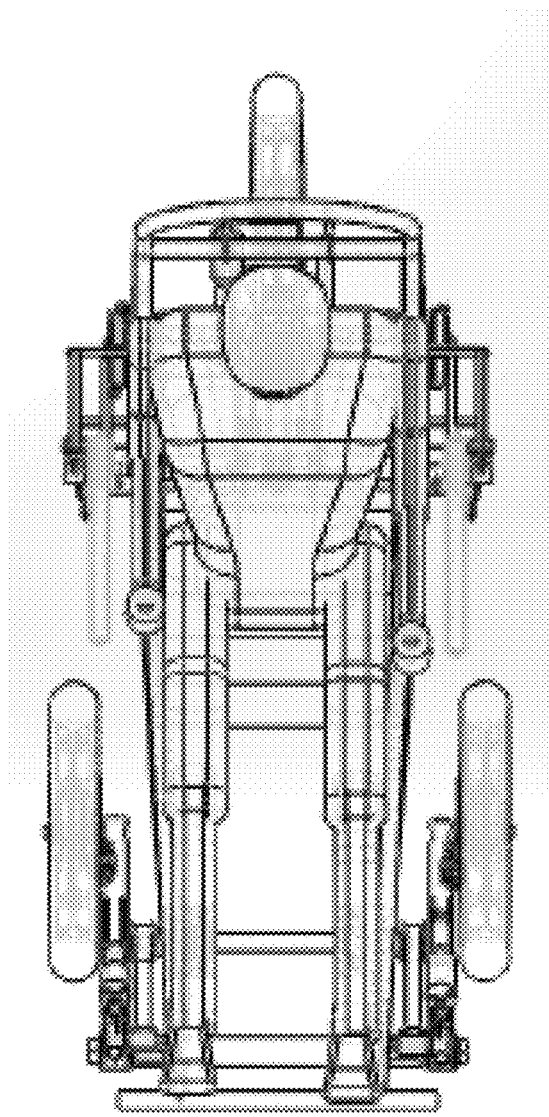

FIG. 18 shows top-down view of a three-wheeled vehicle geometry having a person configured therein.

Figure 19:
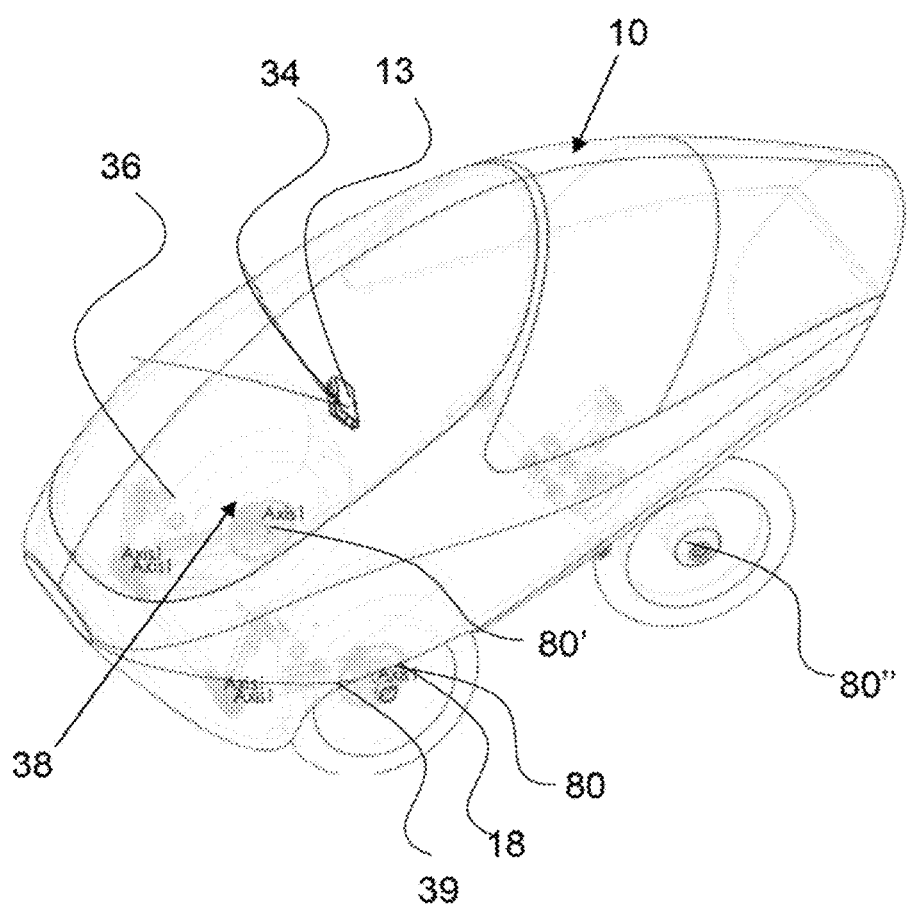

FIG. 19 shows an isometric view of an exemplary three-wheeled vehicle with a smart electronic device configured therein.

Figure 20:
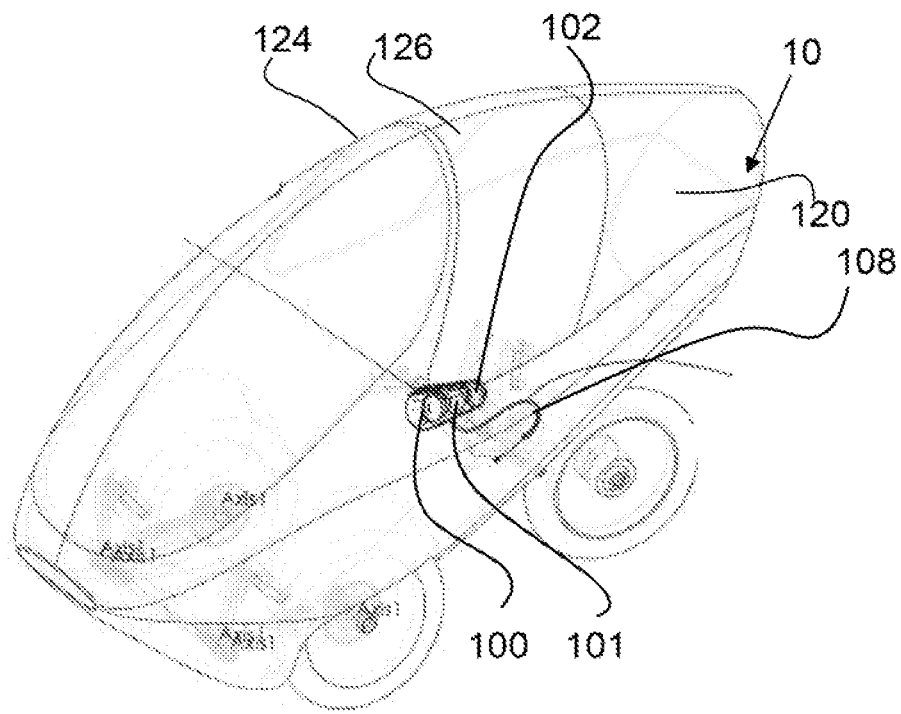

FIG. 20 shows an isometric view of an exemplary three-wheeled vehicle having a light, blinker and mirror assembly.

Figure 21:
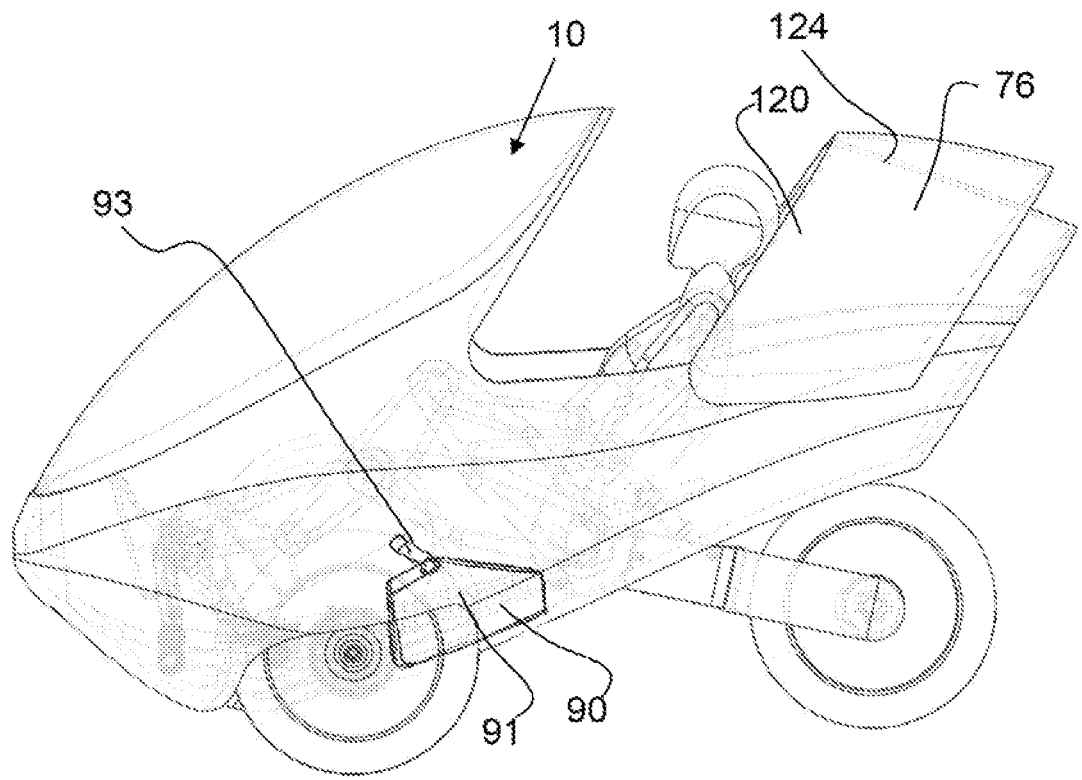

FIG. 21 shows a view of an exemplary three-wheeled vehicle having a battery module configured to be detached and easily carried by an operator.

Figure 22:
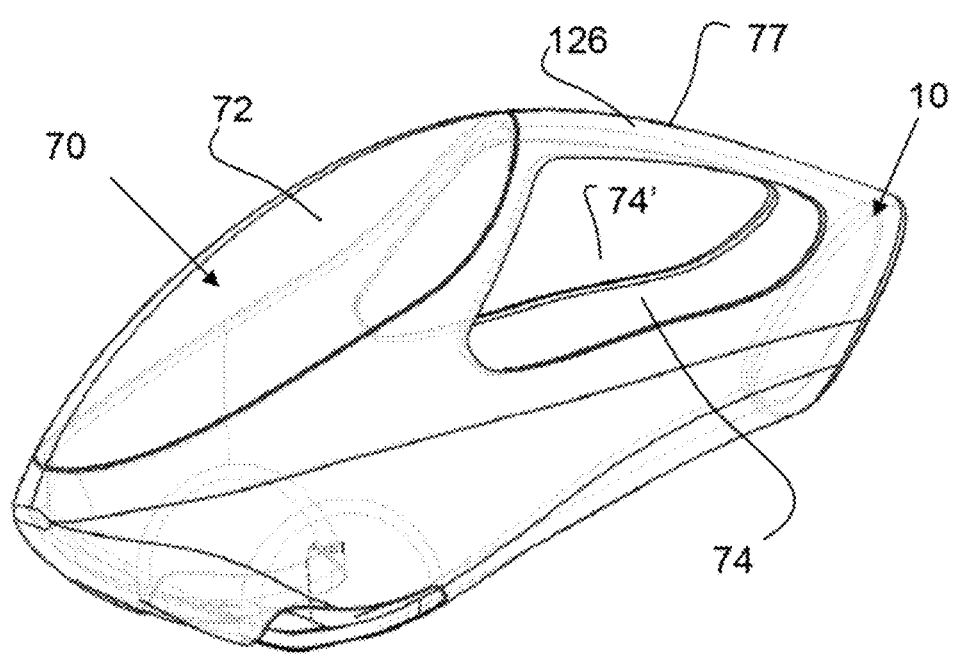

FIG. 22 shows an isometric view of an exemplary three-wheeled vehicle shell body having a roof portion.

Figure 23:
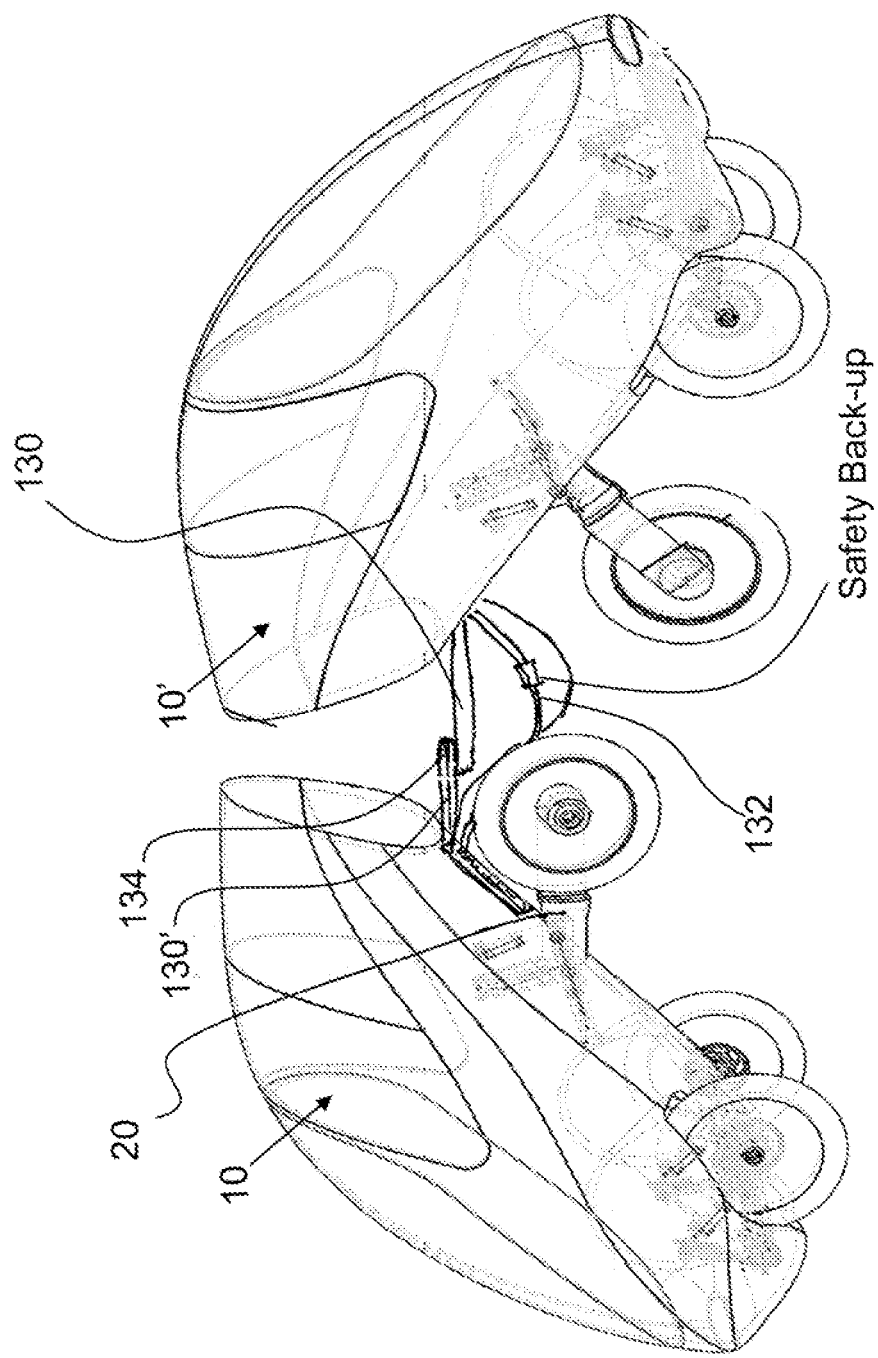

FIG. 23 shows an isometric view of an exemplary three-wheeled vehicle is towing another three-wheeled vehicle.

Figure 24:
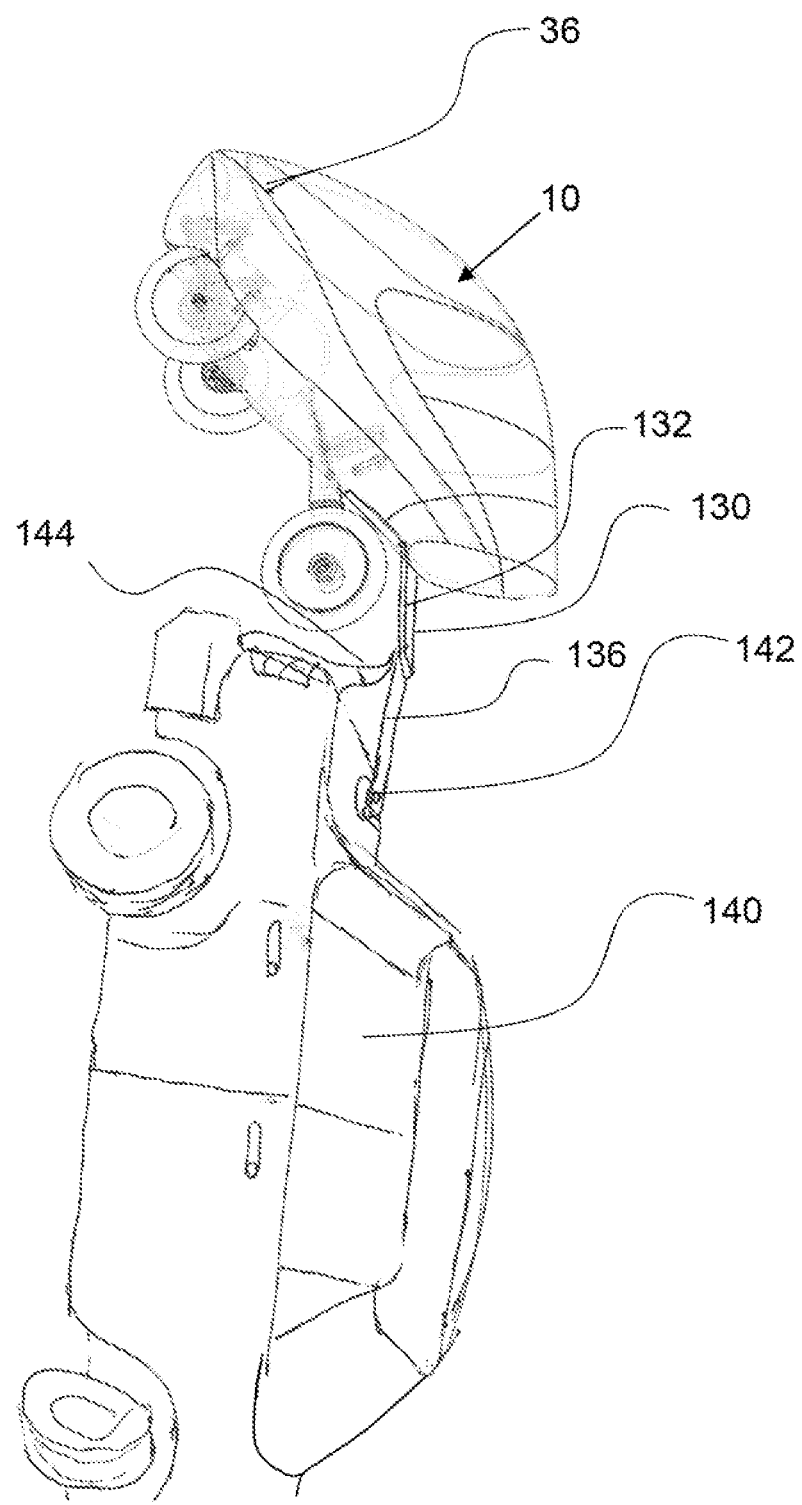

FIG. 24 shows an isometric view of an exemplary three-wheeled vehicle is being towed by an automobile.

Figure 25:
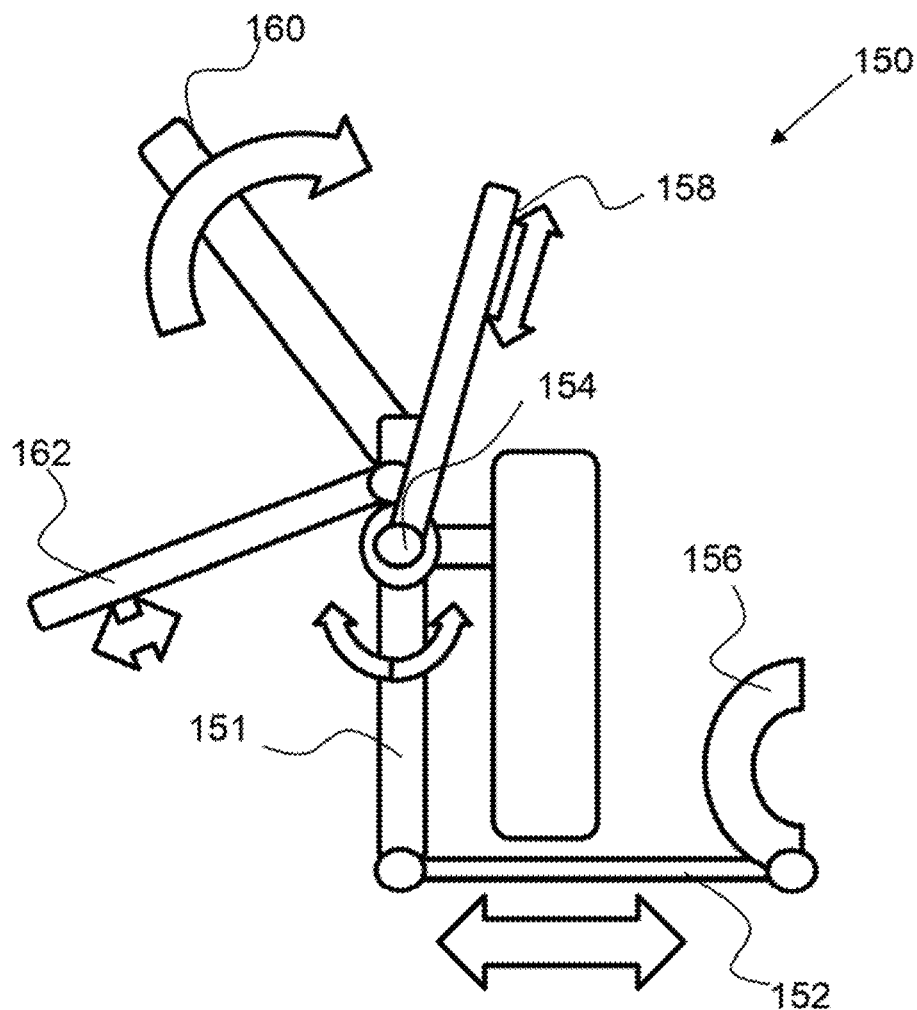

FIG. 25 shows a side view of an exemplary steering input splitter in a low speed configuration.

Figure 26:
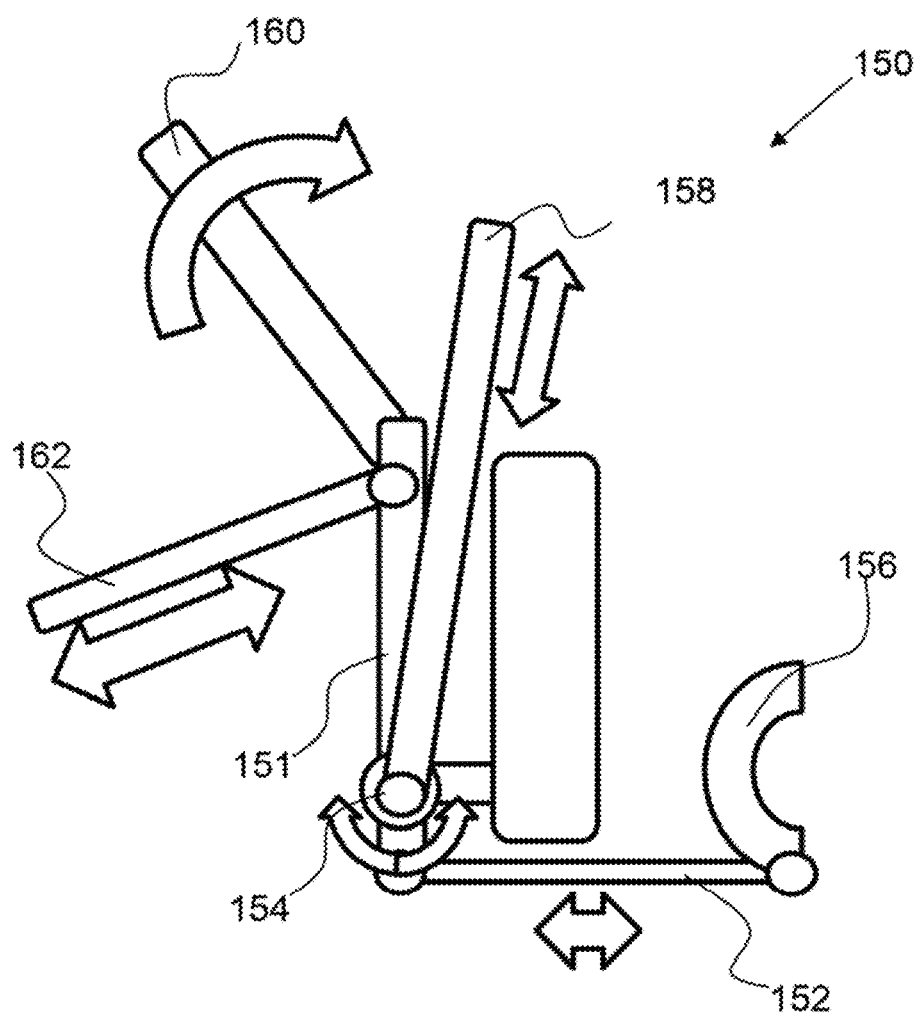

FIG. 26 shows a side view an exemplary steering input splitter in a high speed configuration.

Figure 27A:
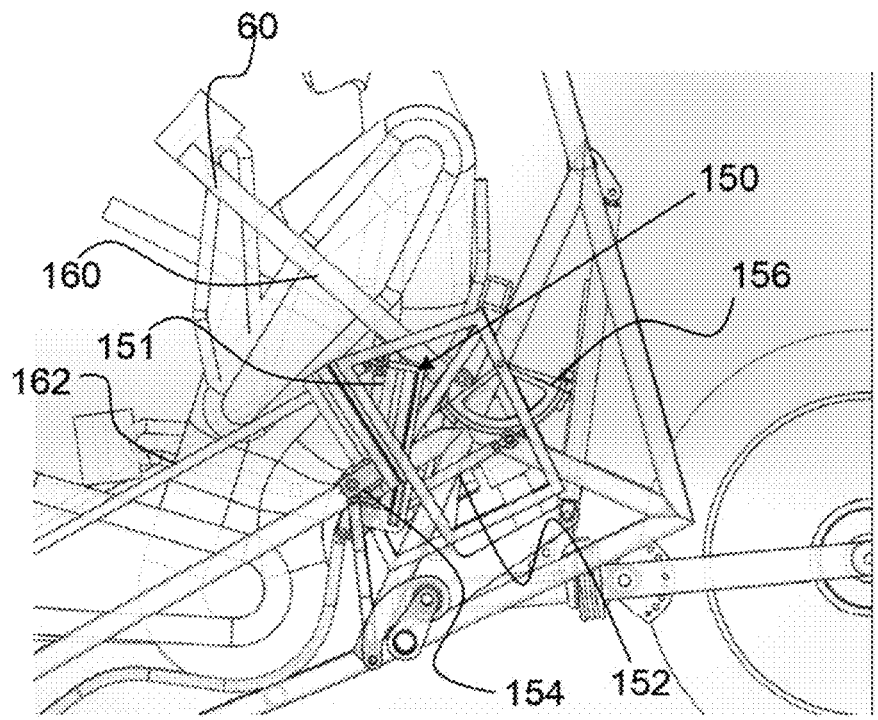

FIG. 27A shows a side view an exemplary steering input splitter in a high speed configuration.

Figure 27B:
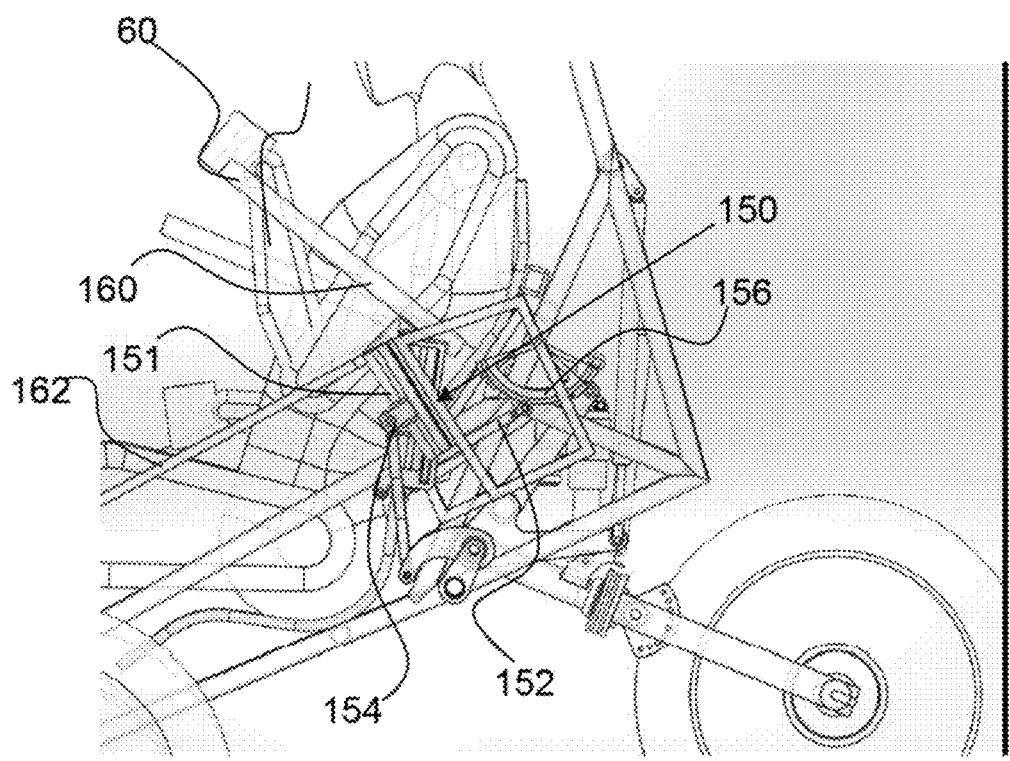

FIG. 27B shows a side view an exemplary steering input splitter in a mid-speed configuration.

Figure 27C:
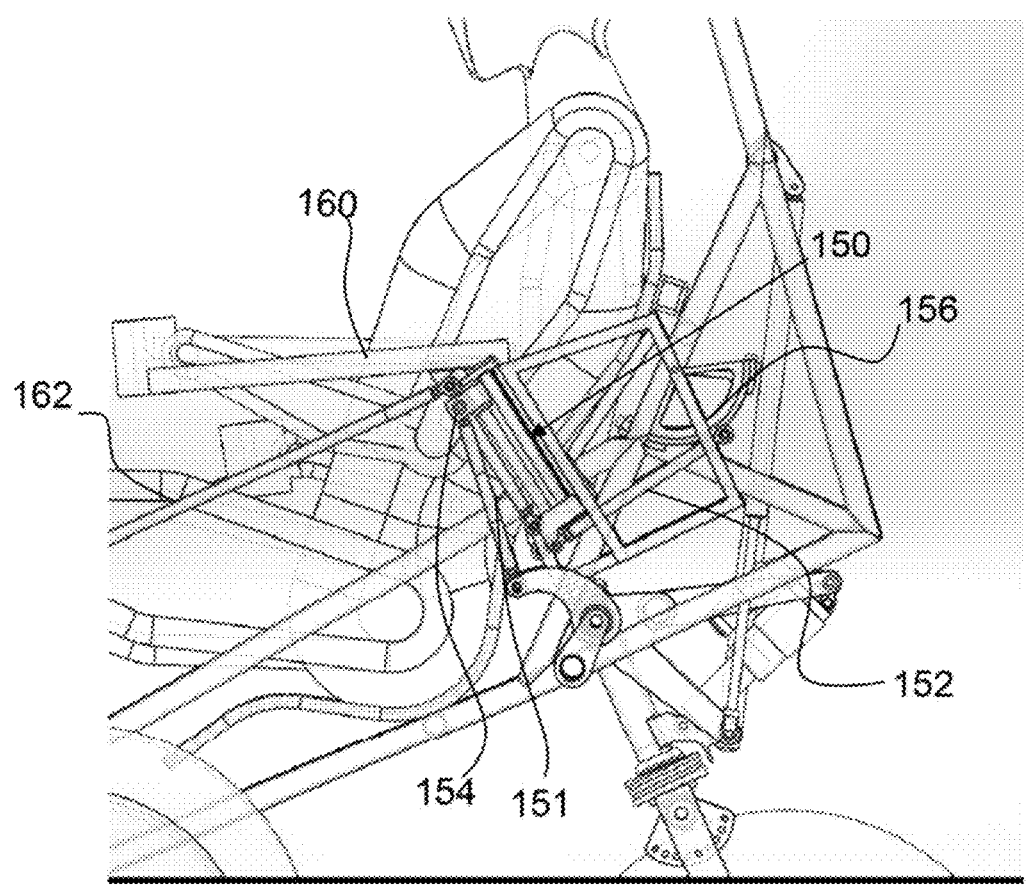

FIG. 27C shows a side view an exemplary steering input splitter in a low speed configuration.

Figure 28:
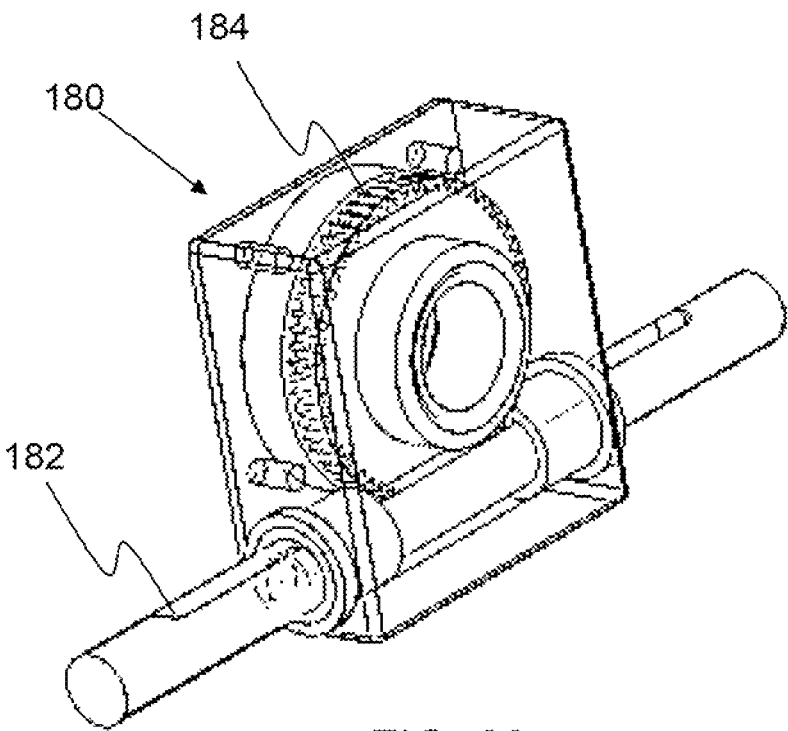

FIG. 28 shows an isometric view of an exemplary rack and pinion steering device.

Figure 29:
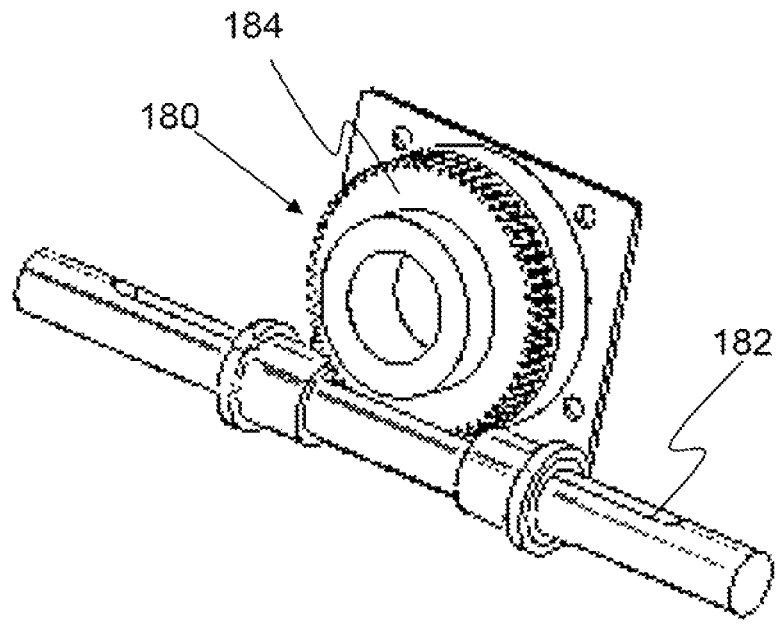

FIG. 29 shows an isometric view of an exemplary rack and pinion steering device.

Figure 30:
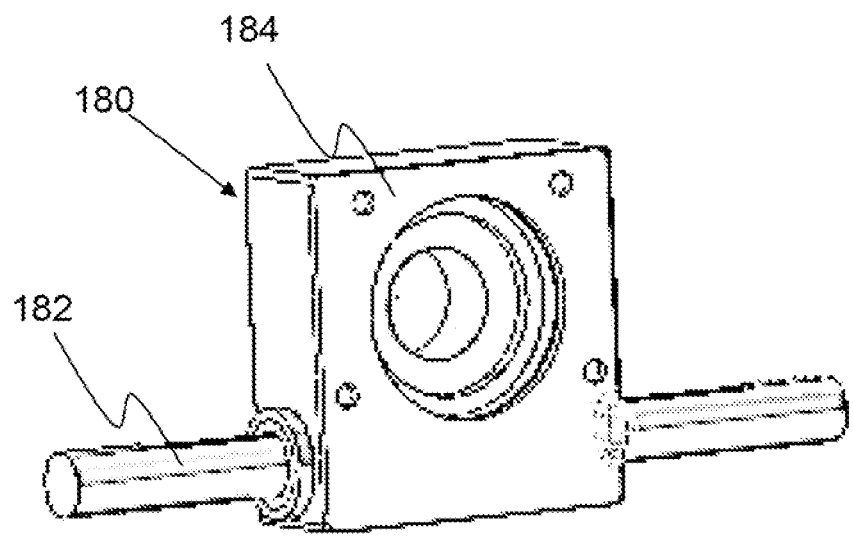

FIG. 30 shows an isometric view of an exemplary rack and pinion steering device.

Figure 31:
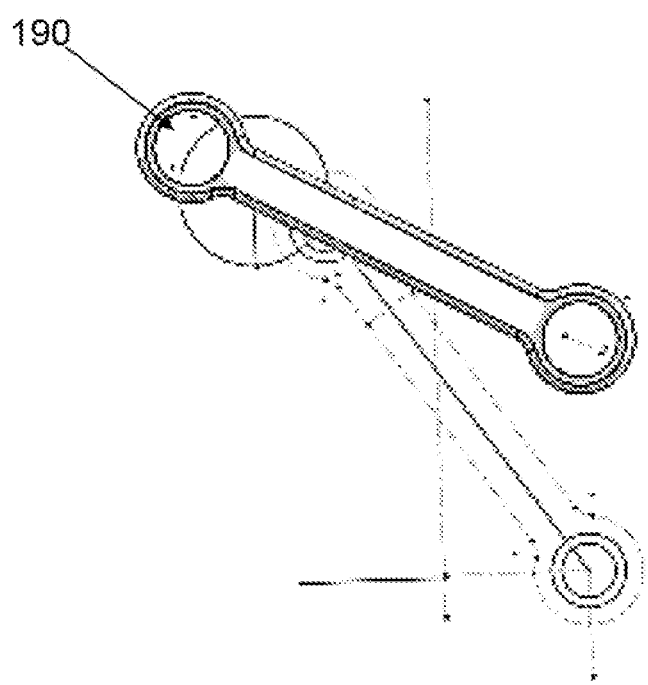

FIG. 31 shows a top-down view of an exemplary compound steering arm device.

FIG. 32 shows a spreadsheet of steering input splitter ratios.

Figure 33:
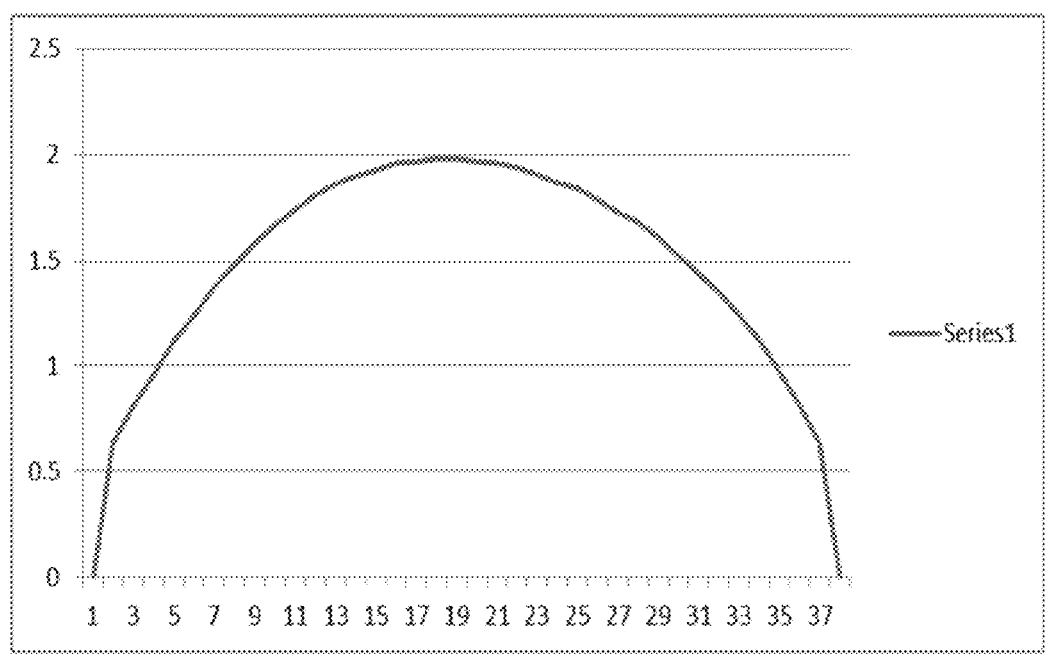

FIG. 33 shows a graph of the steering response as a function of steering input.

Figure 34:
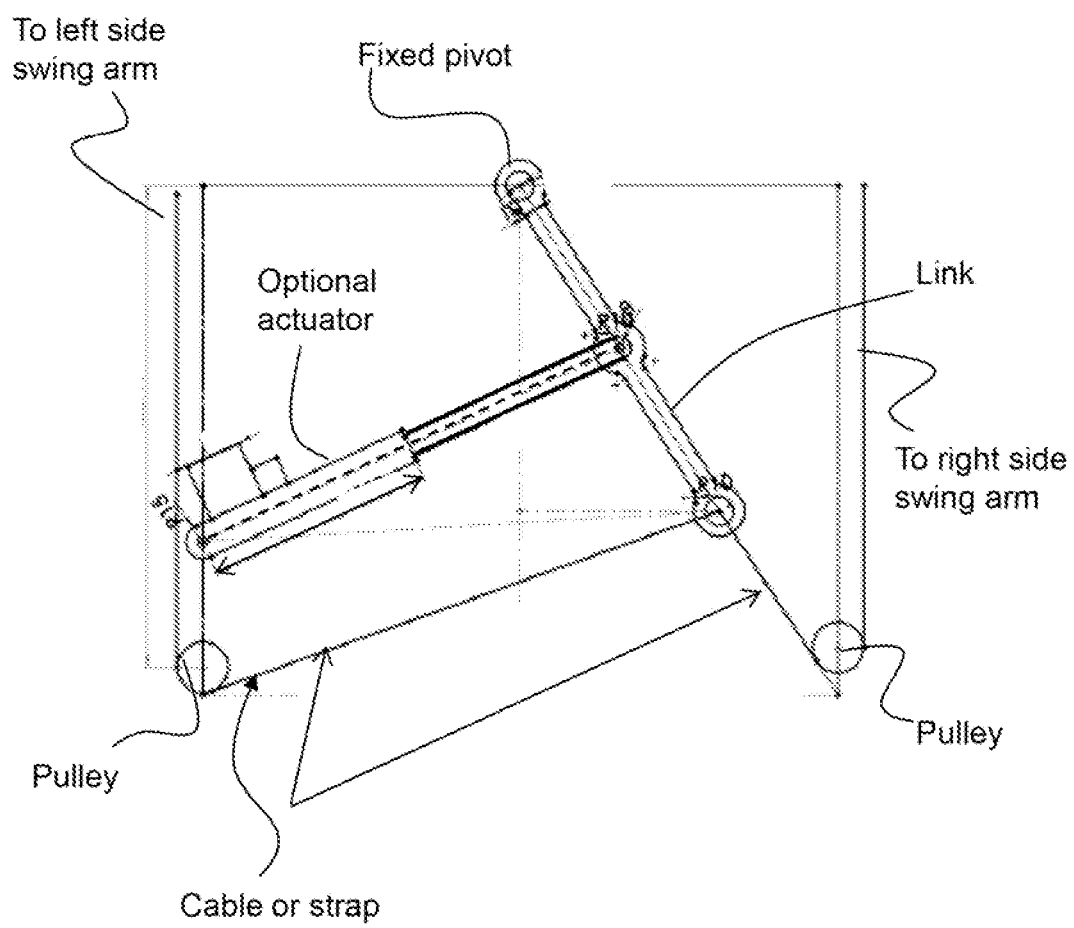

FIG. 34 shows an exemplary center differential configuration.

Figure 35:
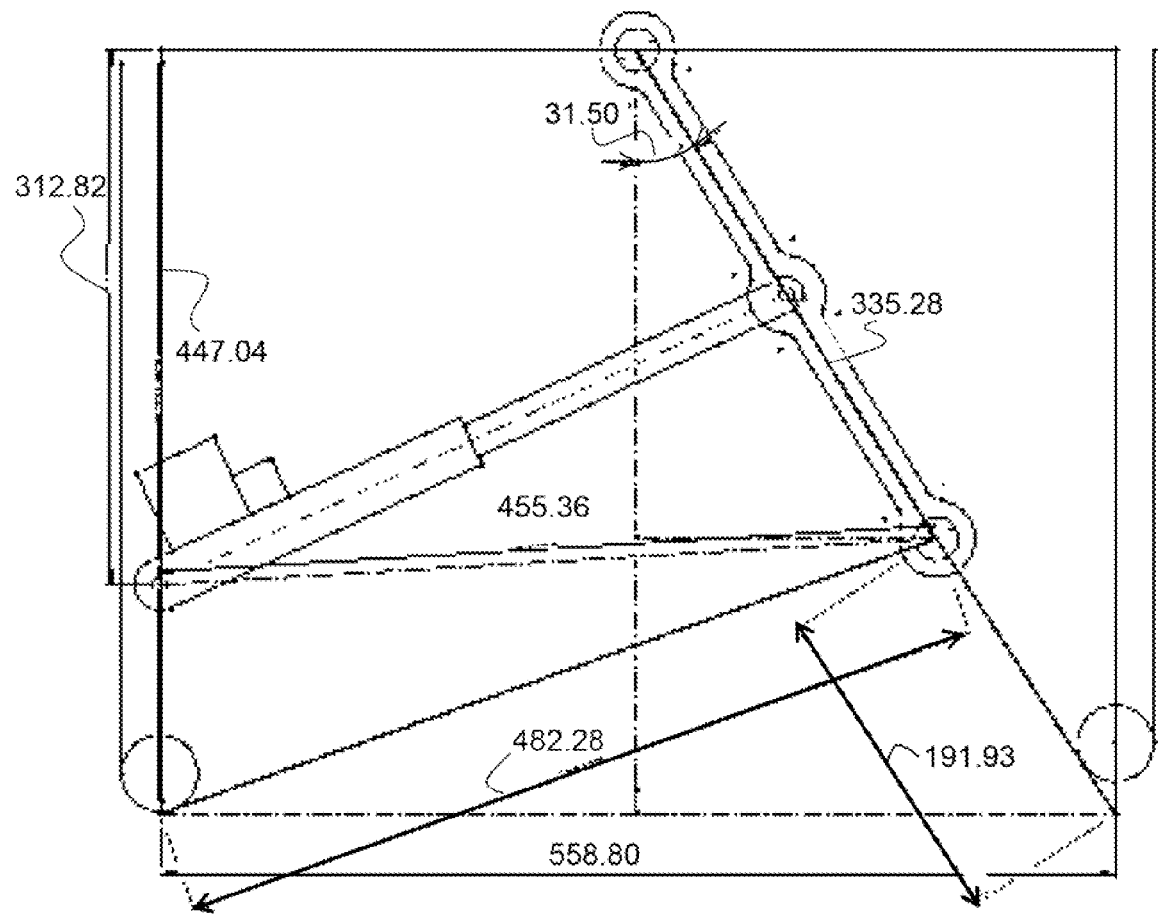

FIG. 35 shows an exemplary center differential configuration.

Figure 36:
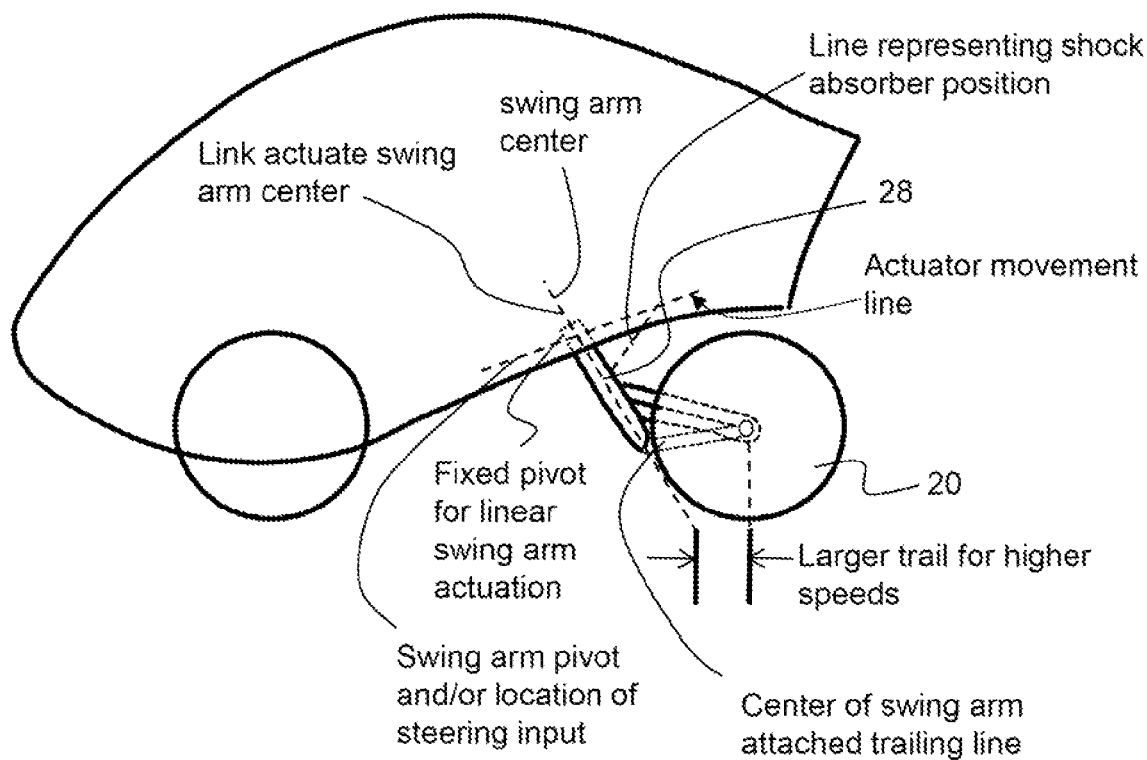

FIG. 36 shows a geometry for controlling the back wheel trail of an exemplary three-wheeled vehicle.

Figure 37A:
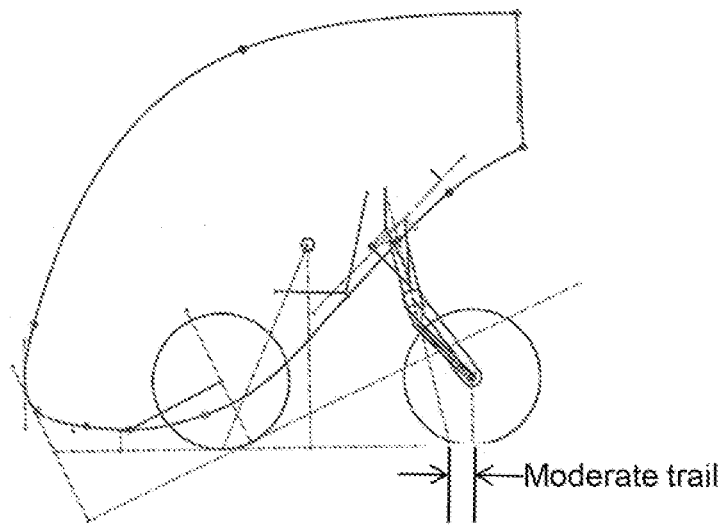
Figure 37B:
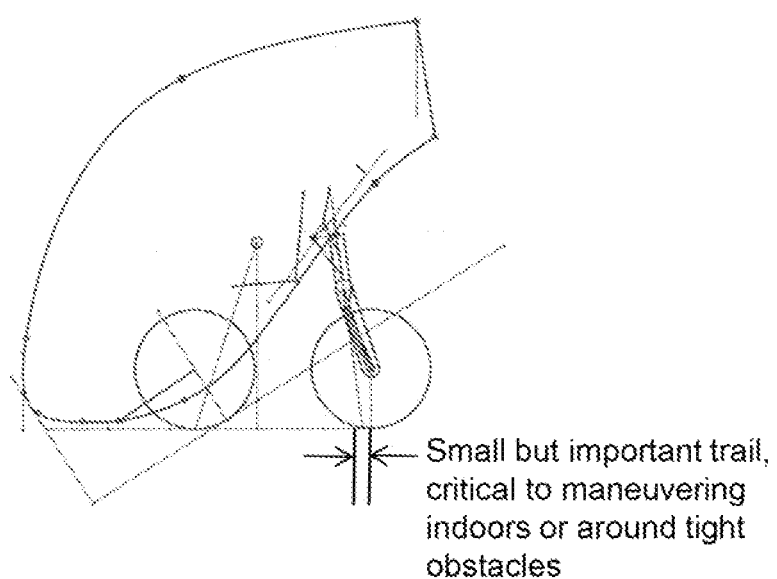
Figure 37C:
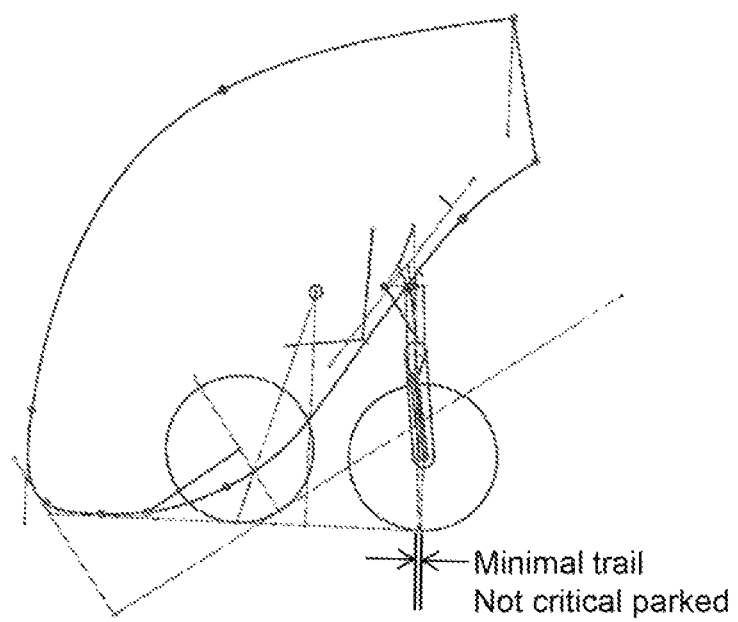

FIG. 37A-37C show the geometry of an exemplary three-wheeled vehicle and trial of the back wheel.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary three-wheeled vehicle 10 comprises two forward wheels 22, 23 and one back wheel 20 and a protective shell 17. The left front wheel 22 and right front wheel 23 make up the forward wheels. The three-wheeled vehicle shown in FIG. 1 has a protective shell enveloping the three-wheeled vehicle, or substantially covering at least the front, back, top and sides of the vehicle body. The protective shell of the three-wheeled vehicle is configured to be aerodynamic and have low drag. A protective shell that envelops a three-wheeled vehicle may not cover the wheels of the vehicle as shown in FIG. 1. A protective shell is a material that prevents wind and rain from passing therethrough, provides some protection in the event of an accident, and may comprise any suitable material or combination of materials including, but not limited to, polymer, polypropylene, glass, metal, fabric, composites, and the like. A protective shell may comprise transparent portions, or windows, whereby an operator or passenger may see through. In addition, one of more windows may be configured for opening. A protective shell may be configured over any portion of the three-wheeled vehicle. For example, a protective shell may cover the front portion of the vehicle and a portion of either side of the vehicle. A protective shell may comprise one or more shell panels that may be configured for being detachably attached to the vehicle. An operator may decide to remove side panels for example when the weather is nice and may choose to add additional panels when the weather is foul or the temperature is too low As shown in FIG. 2 the exemplary three-wheeled vehicle has a plurality of windows including a front window 72, and side window 74. A window may be configured to open or be detached from the vehicle. A protective shell may be aerodynamic in shape, whereby it provides a low drag. The shape of the protective shell shown in FIG. 1-4, may be described as substantially tear drop shaped, wherein the outer surfaces are rounded and have a continual contour from the front of the vehicle to the back of the vehicle and wherein the front portion has a larger volume than the back portion. A traditional car typically has a plurality of substantially planar surfaces, wherein the hood is a substantially planar surface that is parallel with the ground and transitions to the windshield that is configured at an angle to the plane of the ground, whereby the contour from the hood to the windshield is a non-continual contour manner.

As shown in FIG. 3, an exemplary three-wheeled vehicle has an aerodynamic protective shell enveloping the vehicle. The protective shell has no planar surface along the outer shell from the front of the vehicle to the back of the vehicle. The exemplary three-wheeled vehicle shown in FIG. 1-4 is configured for one operator and no passengers.

As shown in FIG. 4, an exemplary three-wheeled vehicle 10 comprises a front entry 70, whereby the front entry 70, opens to allow access to the interior of the vehicle. The front entry 70 may comprise a front window 72 and may be considered a door 73. The front entry 70 can open in any suitable manner, including, to the side as shown in FIG. 4, upward from the bottom with a pivot along the top portion of the window, or slide along the contour of the vehicle whereby the front window slides up from the bottom. A door may be configure in any suitable location such as in the front portion of the vehicle as shown in FIG. 4, along the sides of the vehicle or in the back of the vehicle. The front portion of the vehicle is the portion of the vehicle that faces forward and in one embodiment is the portion of the vehicle above and in front of the two forward wheels.

As shown in FIG. 5, an exemplary three-wheeled vehicle has side window 74 that is open. An operator 11 is shown in the vehicle with their feet on a pedaling device 15. A person may pedal the pedaling device to directly power the vehicle, or preferably to charge a battery or batteries 19, such as through a generator. A human power input device 50 such as a pedaling device may be configured in any suitable location on the vehicle. A pedaling device may be configured for the operator to use their arms to pedal the device. A control system 13 may provide resistance to the pedaling device 15 that is related to the speed of the vehicle, whereby pedaling is at a lower gear ratio or equivalent resistance at low speeds or at a higher gear ratio or equivalent higher resistance at higher speeds. A control device may provide a person with a workout program that varies the pedaling resistance according to a protocol and this protocol may use feedback features such as heart rate to control the pedaling resistance. For example, the steering device may comprise a heart rate monitor that measures the heart rate of the operator. A control system may use the operators heart rate and may vary the pedaling resistance to maintain or vary over a protocol the operators heart rate. An operator may be able to pedal the pedaling device when stopped at a stop light to power the batteries. An operator may use pedal input to control the forward speed of the vehicle if desired. The pedaling device may be a traditional rotational pedaling device whereby two pedals rotate around in a generally circular fashion. In an alternative embodiment, a pedaling device may comprise a pair of pedals that reciprocate, or travel in an arc.

As shown in FIG. 6, an exemplary three-wheeled vehicle 10 is an upright profile position, such as when parked. The profile adjustment feature 14 is extended to raise the rear of the three-wheeled vehicle. The height of the three-wheeled vehicle H, may be a maximum when the vehicle is in a parked configuration. The length L of the vehicle and its wheel base, or distance between the front wheels and the back wheel, may be a minimum when the profile adjustment feature is in the up position as shown in FIG. 6. The back wheel 20 is pulled closer to the front wheel 22, 23 (not shown), when the three-wheeled vehicle is in an up profile position, as shown in FIG. 6. The turning radius would be a minimum in the up profile position.

As shown if FIG. 7, an exemplary three-wheeled vehicle 10 is in a down profile position such as when traveling at elevated speed. The profile adjustment feature 14 is extended out to lower the three-wheeled vehicle, an push the back wheel back and further away from the front wheels. The height of the three-wheeled vehicle H, may be a minimum when the vehicle is in a down profile configuration. The length L of the vehicle may be a maximum when the profile adjustment feature is in the down position as shown in FIG. 7. The back wheel 20 is pushed further away from the front wheel 22, 23 (not shown), when the three-wheeled vehicle is in an down profile position, as shown in FIG. 7.

As shown in FIG. 8 and FIG. 9, the profile adjustment feature may adjust the height of the rear of the vehicle as a function of speed of the vehicle an may have any number of positions between the fully up position shown in FIG. 6, and the fully down position shown in FIG. 7. The variation in profile may be continually and automatically adjusted by the control system, or it may have some or all operator input control. An operator may be able to adjust the profile or provide some input for personal preference or for a particular type of conditions, such as loose road conditions or windy environments. A profile adjustment feature may comprise one or more linear actuators (not shown but shown in FIG. 10 through 14), and one or more pivots to enable the height of the vehicle to be adjusted, as shown in FIG. 8 and FIG. 9. The length of an actuator is adjusted to change the height of the vehicle, as it does in this embodiment, the wheel base changes also, enhancing stability.

As shown in FIG. 10, a three-wheeled vehicle frame comprises a linear actuator coupled to the back wheel 20. The frame is elevated up or vertically as shown in FIG. 10. An up position, such as when the three-wheeled vehicle is parked allows for easy entry into the vehicle. As shown in FIG. 11, the three-wheeled vehicle frame is in a down position.

As shown in FIG. 12, a three-wheeled vehicle has the back wheel 20 turned 90 degrees from the zero turn radius. The zero turn radius is between the two front wheels, whereby the two front wheels turn in opposite directions as the back of the vehicle rotates around a center point between the two front wheels. Also shown in FIG. 12 the steering control 16 comprises steering control actuators 60, that are discrete levers configured on either side of the operator 11 and pivoting substantially about the elbows, that can be push or pulled to steer and or lean the vehicle. Any suitable type of steering controller may be used including a wheel, a joystick and the like. In one embodiment, the three-wheeled vehicle, as described herein can pivot or rotate 360 degrees substantially within its own dimensions.

As shown in FIGS. 13 and 14, the three-wheeled vehicle frame has the back wheel 20 turned at 90 degrees to the zero turn radius.

FIG. 15A and FIG. 15B show a diagram of the zero turn radius of the three-wheeled vehicle. The back tire 20 is turned 90 degrees to the front wheel axis 27, or line between the two front wheels. The two front wheels move in opposing directions as indicated by the arrows on the wheels, with the left front wheel 22 moving forward and the right front wheel 23 moving backward. This motion moves the vehicle about a midpoint between the two front tires along the front wheel axis, or zero turn radius point 25. The three-wheeled vehicle can be configured with a very small turn radius or substantially within its own dimensions when the vehicle is in an up profile position, or when the back wheel is as close as possible to the front wheels. FIG. 15B shows the turn radius 27 about the zero turn radius point 25.

FIG. 16 shows an embodiment where an actuator, controlled by an accelerometer circuit (not shown) moves a cable or strap back connecting the two swing arms causing the vehicle to lean (tilt) such that the operator does not feel substantial side acceleration.

FIG. 17 shows the two front wheels 22, 23 and the back wheel 20 having swing arms 28 configured thereto. The front wheels are connected to swing arms that are in front of the wheels or at least in front of the front wheel axis. Likewise, the back wheel is coupled to a swing arm 28' configured in front of the back wheel. A strap may connect the swing arms.

As shown in FIG. 18, an operator is configured in the frame of a three-wheeled vehicle. The operator has his hands on the handle type steering controllers 16.

As shown in FIG. 19, a three-wheeled vehicle 10 comprises a smart electronic device 34 that may control portions of the vehicle. A smart electronic device may be a part of the three-wheeled vehicle or a device that is coupled to the vehicle, such as a smart phone or tablet computer. For example, a user may enter the vehicle and install their smart phone into the input jack, dock or docking station of the three-wheeled vehicle and load the appropriate application. This application may receive input from vehicle sensor and provide control for the operation of the vehicle. An inertia sensor and/or speedometer may be used to control the profile adjustment feature for example. The three-wheeled vehicle may be lowered as speed is increased. The three-wheeled vehicle may have a first height at a first speed that is higher than a second height at a second speed when the second speed is greater than the first speed. For example when the vehicle is entering a turn, the inertial sensor 36 may provide a signal to the actuator(s) to raise one wheel and lower the other to provide an appropriate and safe amount of tilt around the turn. Also depicted in FIG. 19 is an automatic tilt feature that comprises an inertia sensor 36, control system 13 and a wheel actuator 39 coupled to both the left and right front wheels. An inertial sensor 36 may control actuators that control the height of the front wheels as described. Three electric motors 18 are configured coupled to the wheels of the three wheeled vehicle. An electric motor may be directly attached to the wheels, such as hub motors 80 as shown attached to all three wheels of the vehicle. Any suitable number of motors may be used such as only two on the two front wheels, or one on the back wheel. An electric motor may be coupled to one or more wheels through any suitable manner, including through gears and a drive shaft, or a belt and the like.

As shown in FIG. 20 an exemplary three-wheeled vehicle 10 has a light and mirror assembly 101 configured on the side of the vehicle. The light and mirror assembly 101 comprises a light such as a high beam and or may include a low beam also 100 and a mirror configured on the back side of the assembly. The assembly may also integrate blinkers. A lean correction cable 108 provides adjustment of the position of the light assembly and or mirror as a function of the height of the vehicle. A camera may be configured on the vehicle to provide an image of a side or rear view of the vehicle and displayed on the smart device. A camera may also be coupled with a lean correction cable. A light, mirror, camera(s), or assembly comprising any of these components may be configured to be detachable from the three-wheeled vehicle and may be configured on the left side 120, right side 124 and/or top of the vehicle.

As shown in FIG. 21 an exemplary three-wheeled vehicle 10 has a battery module 90 configured to be detached and easily carried by an operator. The module shown has a battery module handle 93, whereby an operator may conveniently remove a battery module from the vehicle and plug it into outlet such as a 110 outlet. The battery module may include an integrated charger and or BMS (battery Management system). A three-wheeled vehicle may comprise any number of battery modules including one, two, three, more than three and the like. A battery module may comprise any suitable number of batteries including one, two, three, more than three, more than five, more than ten, and any ratio between and including the number of batteries listed.

Also shown in FIG. 21 is a window assembly 76 that extends from one side of the vehicle to the other side of the vehicle. A window assembly may be curved to substantially match the contour of the vehicle and may comprise one or more window portions. In an exemplary embodiment a window assembly consists substantially of a transparent window, whereby a continuous window portion extends from the left side of the vehicle to the right side of a vehicle. The opening option may be only partly transparent and part may be also structural.

As shown in FIG. 22 an exemplary three-wheeled vehicle shell 17 comprises a roof portion, a front window 72 and discrete side windows 74, 74 The roof portion 77 may provide for improved security and safety of passengers in the event of a roll-over. The discrete side windows 74 may be any suitable size and may be configured to open, such as by sliding or pivoting open, and/or may be detachable. The front window 72 may be any suitable shape and may also be a front entry 74. Any portion of a front entry may comprise a window portion of any suitable shape and size and this window portion may be detachable or configured to open, such as by sliding open or opening by a hinge, for example. In one embodiment, the lower portion of a front entry 74 is made of structural material and a window is configured in an upper portion of the front entry.

As shown in FIG. 23 an exemplary three-wheeled vehicle 10 is towing another three-wheeled vehicle 10'. A tow lever 130 from the first three-wheeled vehicle 10 is coupled with a tow lever 130' from the second three-wheeled vehicle 10'. At least one of the tow levers is configured with a pivot 134, such as at the coupling point between the two vehicles. A tow lever may be configured to lock into a position, or pivot about a point where the tow lever is coupled to the vehicle. A power coupling 132 is coupled between the two vehicles and provides for power transfer between a first and second vehicle. As shown, the towed vehicle 10 is being towed with the rear wheeled raised.

As shown in FIG. 24 an exemplary three-wheeled vehicle 10 being towed by an automobile 140. The three-wheeled vehicle is being towed by a tow lever 130 fully unfolded and extending from the vehicle to the automobile and coupled to a suction cup 142. The suction cup is attached to the trunk cover of the automobile but may be located in any suitable location including a window, back window, top or sides of car, bumper and the like. The attachment need not be a suction cup or may be composed of multiple suction cups. Safety strap is configured between the three-wheeled vehicle and the automobile as well. A power coupling 132 extends from the three-wheeled vehicle to the automobile and may provide power to the three-wheeled vehicle. For example, the automobile may be a hybrid or electric vehicle and the three-wheeled vehicle may provide electric power to the automobile during towing or hybrid functionality, whereby the three-wheeled vehicle propels and/or brakes along with the towing vehicle. Electric power may be generated by the three-wheeled vehicle while it is being towed, or only when the towing vehicle slows. An inertia sensor 36 on the three-wheeled vehicle may sense acceleration and deceleration and may apply brakes or to power the three-wheeled vehicle. In this manner, the three-wheeled vehicle may provide less drag on the automobile and save energy.

As shown in FIG. 25, an exemplary steering input splitter 150 in a low speed configuration where the steering actuator linkage 154 is moved more as a function of steering input from the steering apparatus linkage 160 than the tilt actuator linkage 162. The profile adjustment linkage 158 is coupled to the steering ratio mechanism 151 that adjust the relative amount of steering versus tilt of the vehicle. At slow speeds, when the profile adjustment feature has the vehicle in an up profile orientation and the balance of steering is weighted to steering via the back wheel than it is to tilt of the vehicle. At relatively high speeds, the profile adjustment feature has the vehicle in a more down profile orientation which changes the balance of steering more to a tilting that steering. The profile adjustment feature, as described herein, is coupled with the profile adjustment linkage 158 of the steering input splitter 150. The steering ratio mechanism 151 shown in FIGS. 25 and 26 is a slide, whereby the amount of movement of the two linkages, the tilt actuator linkage 162 and the steering actuator linkage 152, is changed as the steering actuator pivot 154 moves along the steering ratio mechanism 151, or slide. The arrow around the steering actuator pivot show how the mechanism rotates as a function of steering input from the steering apparatus linkage 160. The long double sided arrow along the steering actuator linkage 152 in FIG. 25 show that the steering is dominate during slow speed operation of the vehicle and reduced as shown in FIG. 26, when the vehicle is moving at higher speeds as indicated by the short arrows along the steering actuator linkage 152. Likewise the short double sided arrow along the tilt actuator linkage 162 in FIG. 25 indicates that tilt is a smaller contribution to steering at slow speeds and a higher contribution to steering, longer arrows in FIG. 26, at higher speeds. The profile adjustment linkage 158 may be an physical linkage to the steering input splitter 150 as shown in FIG. 25 and FIG. 26, or it may be controlled by a sensor that measures speed, profile adjustment feature position, wind conditions, and/or road surface conditions e.g. slip of tires, and any combination thereof. For example, a speedometer may be coupled to the control system and an actuator may move the steering actuator pivot to adjust steering input balance.

As shown in FIG. 26 an exemplary steering input splitter 150 is in a high speed configuration where the steering actuator linkage 154 is moved less as a function of steering input from the steering apparatus linkage 160 than the tilt actuator linkage 162.

As shown in FIG. 27A an exemplary steering input splitter 150 is in a high speed configuration where the steering actuator linkage 154 is moved less as a function of steering input from the steering apparatus linkage 160 than the tilt actuator linkage 162.

As shown in FIG. 27B an exemplary steering input splitter 150 is in a mid-speed configuration where the steering actuator linkage 152 is moved more as a function of steering input from the steering apparatus linkage 160 than the when in a high speed configuration and less than when in a low speed configuration, or when the vehicle is moving at a higher rate of speed, or lower rate of speed respectively. Likewise, when a steering input splitter 150 is in a mid-speed configuration the tilt actuator linkage 154 is moved less as a function of steering input from the steering apparatus linkage 160 than the when in a high speed configuration and more than when in a low speed configuration, or when the vehicle is moving at a higher rate of speed, or lower rate of speed respectively.

As shown in FIG. 27A, an exemplary steering input splitter 150 is in a high-speed configuration where the steering actuator linkage 154 is moved less as a function of steering input from the steering apparatus linkage 160 than when in a lower speed configuration.

As shown in FIG. 27B, an exemplary steering input splitter 150 is in a mid-speed configuration where the steering actuator linkage 154 is moved less as a function of steering input from the steering apparatus linkage 160 than when in a lower speed configuration.

As shown in FIG. 27C, an exemplary steering input splitter 150 is in a low-speed configuration where the steering actuator linkage 154 is moved more as a function of steering input from the steering apparatus linkage 160 than when in a higher speed configuration.

As shown if FIG. 28, an exemplary rack and pinion steering device has a rack 182 and pinion 184. The rack may be coupled to the steering actuator linkage 152, as shown in FIGS. 25-27, and the pinion may be coupled to the wheel. (Please identify swing arm pivot then we can say that the rack rod 182 is positioned at the pivot of the swing arm so that moving the rack rod 182 is not affected by the angle or the swing arm so that steering is not caused by profile height adjustment.) This rack and pinion is reversed compared to normal rack and pinion steering in that the movement to the rack is the input and the output to cause the wheel to turn is the pinion gear. This arrangement allows the steering to be driven at any angle up and even past 90 degrees each way without the swing arm angle causing steering As shown if FIG. 29, an exemplary rack and pinion steering device has a rack 182 and pinion 184.

As shown if FIG. 30, an exemplary rack and pinion steering device has a rack 182 and pinion 184.

FIG. 31 shows an alternative to the rack and pinion but where the housing and position outlined above are substantially the same. In this embodiment the rack rod is replaced with a simple rod (not drawn) that moves along the short dotted line in the lower right in the drawing, and pivotably connects to the link 190. The link 190 connects to the large circle representing the storing tube of the swing arm. As the rod moves back and forth, the steering tube of the swing arm rotates steering the vehicle. This embodiment is stronger and lower cost and shares the benefit of not causing steering when the angle of the swing arm changes. It also has the advantage of providing variable and favorable sensitivity in steering input such that when steering at near straight, larger movements will cause less steering. When larger movements are necessary such as at very low speed, the mechanism provides greater movement when at greater steering angles.

FIG. 32 shows a spreadsheet of steering input splitter as described above. The ratio shown is the adjustment of steering to lean actuator linkage movement. As can be seen in this example, more than 3 times the input steering movement is required around the straight direction than at near 90 degrees in each direction. The data also show that the operation is substantially symmetrical about straight. That is that the mechanism provides the same characteristics turning right and it does turning left.

FIG. 33 shows a graph of the steering response as a function of steering input. The graph also show that the operation is substantially symmetrical about straight. That is that the mechanism provides the same characteristics turning right and it does turning left.

DEFINITIONS

Protective shell, as used herein, is a material that prevents wind and rain from passing therethrough and may comprise any suitable material or combination of materials including, but not limited to, a polymer sheet, glass, metal, fabric, composites, and the like. A protective shell may comprise transparent portions or windows whereby an operator or passenger may see through. A window may be configured for opening.

The term vehicle is used interchangeable for three-wheeled vehicle throughout the specification.

The phrase "an arrangement of wheels consisting of" is used herein to describe the wheels in contact with the road or driving surface and does not include a spare wheel that may be stored or part of the vehicle.

A profile adjustment device, as used herein, is defined as a device that raise or lowers the vehicle by movement of the back wheel, such as through an actuator, or rotations arm. The profile adjustment device may be an automatic profile adjustment device whereby the profile adjustment device is configured to provide a first vehicle height at first speed and a second vehicle height at second speed and whereby the first height is higher than the second height and the first speed is lower than said second speed.

Another concern with a variable profile vehicle is that the trail of the rear wheel will be unfavorable, perhaps unusable so, if the relationship to trail is not controlled. FIG. 36 and FIG. 37A-37C show a multi-link passive solution to maintain a favorable trail from park, thru very low speed maneuvering (walking speeds), thru lower street speeds, thru high speed. This particular set up provide near zero trail at park, about 35 mm for very low walking speed, 75-100 mm for mid-range speeds and up to 133 mm for the highest speeds. The actuator movement is about 7.5 inches. Another issue is maintaining a favorable shock absorber geometry. Particularly, the rate of shock movement to wheel movement. In one embodiment a higher shock movement rate at higher speeds for greater "stiffness" and a lower rate and "softer" response at lower speeds may be selected.

ADDITIONAL EMBODIMENTS

A three-wheeled vehicle further comprising a plurality of swing arms attaching the wheels to the vehicle.

A three-wheeled vehicle wherein a wheel base distance measure from a center point between the two front wheels and the back wheel, and whereby the profile adjustment device is configured to increase the wheel base as the speed of the three-wheeled vehicle increase.

A three-wheeled vehicle configured to reach a speed of at least 20 mph and comprises at least one illuminated signaling feature.

A three-wheeled vehicle comprising:
a. an arrangement of wheels consisting of:
1. two forward wheels configured essentially parallel to each other;
2. one back wheel configured to steer the vehicle;
b. a profile adjustment device coupled to the back wheel; and providing for rear wheel trail to be adjusted with height.

A three-wheeled vehicle comprising:
a. an arrangement of wheels consisting of:
1. two forward wheels configured essentially parallel to each other;
2. one back wheel configured to steer the vehicle;
b. a profile adjustment device coupled to the back wheel; and
c. a protective shell configured at least over a front portion of the vehicle,
whereby the profile adjustment device is configured to provide a first height of an occupant's head at first speed and a second height of an occupant's head at second speed and whereby the first height is higher than the second height and the first speed is lower than said second speed.

A three-wheeled vehicle comprising:
a. a plurality of swing arms having a vehicle attachment location that is forward to a wheel attachment location,
whereby the height profile adjustment device is configured to provide a first height of an occupant's head at first speed and a second height of an occupant's head at second speed and whereby said first height is higher than said second height and said first speed is lower than said second speed.

A three-wheeled vehicle comprising:
a. a front of the vehicle and a means to raise the front of the vehicle as the vehicle tilts to maintain the vehicle substantially in an upright orientation,
whereby the height profile adjustment device is configured to provide a first height of an occupant's head at first speed and a second height of an occupant's head at second speed and whereby said first height is higher than said second height and said first speed is lower than said second speed.

A three-wheeled vehicle, wherein the protective shell is configured over substantially the entire three-wheeled vehicle.

A three-wheeled vehicle comprising a sound cancelation feature, whereby when an audio signal communicated via the communication feature has a diminished noise component.

A three-wheeled vehicle comprising a door configured in the front of the three-wheeled vehicle, whereby the door is configured for an occupant to enter through the front of the three-wheeled vehicle.

A three-wheeled vehicle, wherein the three-wheeled vehicle is configured for a single occupant, having a single seat.

A three-wheeled vehicle comprising a power assist device coupled to at least one wheel.

A three-wheeled vehicle wherein the power assist device is an internal combustion engine.

A three-wheeled vehicle wherein the power assist device is an electric motor.

A three-wheeled vehicle wherein an electric motor configured on at least one wheel.

A three-wheeled vehicle wherein an electric motor is configured on all three wheels.)

A three-wheeled vehicle comprising a pedal device coupled to at least one wheel and configured to propel the vehicle.

A three-wheeled vehicle comprising an automatic tilt (lean of vehicle) feature, whereby the amount of tilt enabled by the vehicle is reduce at elevated speed.

A three-wheeled vehicle comprising a regenerative braking feature and a rechargeable battery, whereby braking energy is stored in the rechargeable battery.

A three-wheeled vehicle comprising a smart electronic device interface feature.

A three-wheeled vehicle configured for to reach a speed of at least 20 mph and comprises at least one illuminated signaling feature.

A three-wheeled vehicle comprising:
a. an arrangement of wheels consisting of:
  1. two forward wheels configured essentially parallel to each other;
  2. one back wheel configured to steer the vehicle;
b. a height profile adjustment device coupled to the back wheel; and
c. at least one rear view mirror,
whereby the height profile adjustment device is configured to provide a first height of an occupant's head at first speed and a second height of an occupant's head at second speed and whereby the first height is higher than the second height and the first speed is lower than said second speed.

The three-wheeled vehicle of claim 19 further comprising a rear view mirror adjustment feature, wherein the rear view mirror automatically adjust with the profile adjustment device.

A three wheeled vehicle with electric hub motors in each wheel.

A three wheeled vehicle with a human power device that may be a mechanical means.

A three wheeled vehicle with the front two wheels on trailing link swing arms to affect tilt and a rear wheel to affect steering.

A three wheeled vehicle where the rear wheel turns 90 degrees.

A three wheeled vehicle where the front two wheels can turn in opposite directions and vehicle pivots about a center between the front two wheels.

A three wheeled vehicle where the rear wheel is on a variable height allowing for varying the chassis angle.

A three wheeled vehicle where chassis angle varies with vehicle speed.

As in proceeding claims where occupant(s) enter from the front between the two front wheels.

A three wheeled vehicle where peddles are attached not, from a center but from the sides of the vehicle.

A three wheeled vehicle where peddles fold out of the way to facilitate entry and exit.

A three wheeled vehicle where the steering and tilt are a variable ratio of steering input such that steering input at low speed causes a large amount of steer and a small amount of tilt at higher speeds the same steering input causes a small amount of steer and a large amount of tilt.

A three wheeled vehicle where any steering input of a full range of movement will tilt the vehicle such that the occupant(s) do not experience substantial side acceleration and will steer the vehicle the that will still keep the vehicle within the safe turning limits such that the vehicle will not rollover.

A three wheeled vehicle where at zero forward speed rear wheel will turn 90 degrees.

A three wheeled vehicle where rear wheel is driven by a motor or motor/generator to facilitate turning A three wheeled vehicle with 1 or more electric being in the wheel.

A three wheeled vehicle where electric motors are controlled to eliminate wheel spin as in traction control and abs systems.

A three wheeled vehicle where motor(s) are controlled for position so that the vehicles motors are synchronized to the direction of steering.

A three wheeled vehicle where steering is accomplished with motors position and torque and rear wheel acts as a free caster.

A three wheeled vehicle where it operates autonomously or Semi-autonomously.

A three wheeled vehicle where seat is not adjustable and pedals adjust to accommodate different occupants.

A three wheeled vehicle where steering input divide adjusts to accommodate different occupants.

A three wheeled vehicle where steering input is by handles that move substantially about the elbows.

A three wheeled vehicle where a second directions of movement such as inward and or inward and outward or movement forward and backward inputs tilt.

A three wheeled vehicle where the variable chassis angle is compensated for in the headlights and rearview side mirrors.

A three wheeled vehicle where headlight and side mirrors are put together in simplify movement to adjust angle.

A three wheeled vehicle where a cable from the rear swing arm or one of it's driven parts, connects to each mirror/headlight assembly.

A three wheeled vehicle where the vehicle is fully enclosed with a front opening that is both a door and serves as a windshield.

A three wheeled vehicle where door is a plastic with a glass layer on the outside to provide hardness required.

A three wheeled vehicle where the body is both structural and serves as the exterior of the vehicle.

A three wheeled vehicle where reinforcements are molded in the body molding.

A three wheeled vehicle where hollow areas and conduits such as for airflow, wiring and cables are molded into body by placing pre-molded parts such tubes into mold before plastic fills the mold. This may include wiring looms already in tubes.

A three wheeled vehicle where stampings and or tubes, and or castings are used as reinforcements.

A three wheeled vehicle where the access from the door to the seat is unencumbered.

A three wheeled vehicle with wheels enclosed by body as opposed to moving fenders.

A three wheeled vehicle with transverse flux motor/generators in 3 wheels, as hub motors.

A three wheeled vehicle designed to tow a trailer with power cables to allow power transmission to the towing vehicle.

A three wheeled vehicle using motor torque differential to tilt vehicle.

A three wheeled vehicle with a detachable hand-carriable batteries (for recharging easy indoors) comprising 1 or more batteries.

A three wheeled vehicle having a width to fit thru exterior "36"" or larger doors.

A three wheeled vehicle with a differential configured so that the vehicle front rises when tilting to increase clearance and or to have a tendency to go level.

A three wheeled vehicle with wheels having hub motors.

A three wheeled vehicle with where wheels retract into body to tilt.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A three-wheeled vehicle comprising:
   a. an arrangement of wheels consisting of:
      i. two forward wheels configured essentially parallel to each other;
      ii. one back wheel configured to steer the vehicle;
   b. a profile adjustment device coupled to the back wheel;
   c. a protective shell configured at least over a front portion of the vehicle;
   d. a wheel base distance between the two forward wheels and the one back wheel;
   wherein the profile adjustment device is configured to provide a first vehicle height and a first wheel base distance at first seed and a second vehicle height and second wheel base distance at a second speed and wherein the first height is higher than the second height, the first wheel base distance is smaller than the second wheel base distance and the first speed is lower than said second speed; and
   whereby the profile adjustment feature actuates the one back wheel toward and away from the two forward wheels and thereby changes the wheel base distance.

2. The three-wheeled vehicle of claim 1, wherein the profile adjustment device is an automatic profile adjustment device, whereby the profile adjustment device is configured to provide a first vehicle height at first speed and a second vehicle height at second speed and whereby the first height is higher than the second height and the first speed is lower than said second speed.

3. The three-wheeled vehicle of claim 1 further comprising a front portion of the vehicle and a means to raise the front portion of the vehicle as the vehicle leans.

4. The three-wheeled vehicle of claim 1, wherein the protective shell configured over substantially the entire three-wheeled vehicle.

5. The three-wheeled vehicle of claim 1, further comprising a door configured in the front portion of the three-wheeled vehicle, whereby the door is configured for an occupant to enter through the front of the three-wheeled vehicle and wherein the door comprise a translucent window portion.

6. The three-wheeled vehicle of claim 1, wherein a rate of steering per a rider steering input decreases with increasing speed of the three-wheeled vehicle.

7. The three-wheeled vehicle of claim 1, further comprising at least one electric motor, wherein at least one electric motor is configured on at least one wheel.

8. The three-wheeled vehicle of claim 7, further comprising at least one battery, wherein at least one battery is configured to be removable from the three wheeled vehicle, is capable of being carried by hand with a handle coupled thereto and is configured to be recharged with a conventional power plug.

9. The three-wheeled vehicle of claim 1, further comprising a tow lever coupled to a back portion of the three-wheeled vehicle, and wherein the three-wheeled vehicle is configured to be towed by the tow lever with the back wheel elevated.

10. The three-wheeled vehicle of claim further comprising a human power input feature.

11. The three-wheeled vehicle of claim 10, wherein the human power input feature is a reciprocating pedaling device.

12. The three-wheeled vehicle of claim 1, further comprising an automatic tilt feature, whereby the forward wheels are adjusted in height thereby producing a lean of three-wheeled vehicle, to reduce side acceleration felt by an occupant.

13. The three-wheeled vehicle of claim 1, where the vehicle has a zero turn radius, wherein the back wheel can be turned to 90 degrees from the two forward wheels and the two forward wheels can be rotated in opposing directions.

14. The three-wheeled vehicle of claim 1, further comprising at least one rear view mirror.

15. The three-wheeled vehicle of claim 14, further comprising a rear view mirror adjustment feature, wherein the rear view mirror automatically adjust with the profile adjustment device.

16. The three-wheeled vehicle of claim 15 where a headlight and rear view mirror are integrated into an assembly.

17. The three-wheeled vehicle of claim 1 wherein the shell provides substantial structural support for the vehicle.

18. A three-wheeled vehicle comprising:
   a. an arrangement of wheels consisting of:
      i. two forward wheels configured essentially parallel to each other;
      ii. one back wheel configured to steer the vehicle;
   b. a height profile adjustment device coupled to the back wheel;
   c. a wheel base distance between the two forward wheels and the one back wheel;
   wherein the profile adjustment device is configured to provide a first vehicle height and first wheel base distance at first speed and a second vehicle height and second wheel base distance at a second speed and wherein the first height is higher than the second height, the first wheel base distance is smaller than the second wheel base distance and the first speed is lower than said second speed; and
   whereby the profile adjustment feature actuates the one back wheel toward and away from the two forward wheels and thereby changes the wheel base distance; and
   d. a door configured in the front portion of the three-wheeled vehicle,
   whereby the door is configured for an occupant to enter through the front of the three-wheeled vehicle and wherein the door comprise a translucent window portion.

19. A three-wheeled vehicle comprising:
a. an arrangement of wheels consisting of:
   i. two forward wheels configured essentially parallel to each other;
   ii. one back wheel configured to steer the vehicle;
b. a profile adjustment device coupled to the back wheel;
c. a human power input feature comprising pedals;
d. a protective shell configured at least over a front portion of the vehicle; and
e. a door configured in the front portion of the three-wheeled vehicle;
whereby the door is configured for an occupant to enter through the front portion of the three-wheeled vehicle and wherein the door comprise a translucent window portion; and
f. a wheel base length between the two forward wheel and the one back wheel;
wherein the profile adjustment device is configured to provide a first vehicle height and a first wheel base distance at first speed and a second vehicle height and second wheel base distance at a second speed and wherein the first height is higher than the second height, the first wheel base distance is smaller than the second wheel base distance and the first speed is lower than the second speed; and
whereby the profile adjustment feature actuates the one back wheel toward and away from the two forward wheels and thereby changes the wheel base distance.

20. The three-wheeled vehicle of claim 19, wherein the human power input feature is coupled to a generator.

* * * * *